United States Patent
Kezios et al.

(10) Patent No.: US 12,065,538 B2
(45) Date of Patent: Aug. 20, 2024

(54) POLY(GLYCOLIC ACID) FOR CONTAINERS AND FILMS WITH REDUCED GAS PERMEABILITY

(71) Applicant: DAK AMERICAS LLC, Charlotte, NC (US)

(72) Inventors: Peter Kezios, Charlotte, NC (US); Thomas Taylor, Charlotte, NC (US)

(73) Assignee: DAK AMERICAS LLC, Charlotte, NC (US)

( * ) Notice: Subject to any disclaimer, the term of this patent is extended or adjusted under 35 U.S.C. 154(b) by 6 days.

(21) Appl. No.: 17/971,302

(22) Filed: Oct. 21, 2022

(65) Prior Publication Data

US 2023/0323020 A1    Oct. 12, 2023

Related U.S. Application Data

(62) Division of application No. 16/728,144, filed on Dec. 27, 2019, now Pat. No. 11,548,979.

(51) Int. Cl.
| | |
|---|---|
| *C08G 63/08* | (2006.01) |
| *B29D 22/00* | (2006.01) |
| *B29K 67/00* | (2006.01) |
| *C08K 5/092* | (2006.01) |
| *C08K 5/1539* | (2006.01) |
| *C08L 67/02* | (2006.01) |
| *C08L 67/04* | (2006.01) |

(52) U.S. Cl.
CPC ........... *C08G 63/08* (2013.01); *B29D 22/003* (2013.01); *C08K 5/092* (2013.01); *C08K 5/1539* (2013.01); *C08L 67/02* (2013.01); *C08L 67/04* (2013.01); *B29K 2067/003* (2013.01); *B29K 2067/043* (2013.01); *B29K 2067/046* (2013.01); *C08L 2203/16* (2013.01)

(58) Field of Classification Search
CPC ...... C08L 2203/16; C08L 67/02; C08L 67/04; C08K 5/092; C08K 5/1539; C08G 63/06; C08G 63/08; C08G 63/912; B65D 1/0215; B29L 2031/7128; B29K 2067/003; B29K 2067/043; B29K 2067/046; B29D 22/003; B29C 45/0001; B29C 49/0005

See application file for complete search history.

(56) References Cited

U.S. PATENT DOCUMENTS

| | | | |
|---|---|---|---|
| 3,442,871 A | 5/1969 | Schmitt | |
| 5,470,944 A | 11/1995 | Bonsignore | |
| 5,936,045 A | 8/1999 | Warzelhan et al. | |
| 6,114,458 A | 9/2000 | Hawker | |
| 6,310,218 B1 | 10/2001 | O'Brien | |
| 8,362,158 B2 | 1/2013 | Sato et al. | |
| 8,987,343 B2 | 3/2015 | Wautier | |
| 2006/0047088 A1 | 3/2006 | Yamane et al. | |
| 2008/0177009 A1 | 7/2008 | Sodergard | |
| 2008/0207840 A1 | 8/2008 | Sodergard | |
| 2009/0036600 A1 | 2/2009 | Sodergard | |
| 2011/0263811 A1 | 10/2011 | Sawai | |
| 2014/0024769 A1 | 1/2014 | Van Walsem et al. | |
| 2014/0148534 A1 | 5/2014 | Hou | |
| 2015/0291733 A1 | 10/2015 | Hess et al. | |
| 2016/0060387 A1 | 3/2016 | Gadda et al. | |
| 2018/0201724 A1 | 7/2018 | Nurmi | |

FOREIGN PATENT DOCUMENTS

| | | |
|---|---|---|
| EP | 3 246 349 A1 | 11/2017 |
| WO | WO 2016/071574 A1 | 5/2016 |

OTHER PUBLICATIONS

J. Tuominen, et al., "Synthesis and Characterization of Lactic Acid Based Poly(Ester-Amide)", Macromolecules, 2000, 33 (10), Abstract only.

*Primary Examiner* — Frances Tischler
*Assistant Examiner* — Gennadiy Mesh
(74) *Attorney, Agent, or Firm* — Tucker Ellis LLP; J. Derek Mason

(57) ABSTRACT

Compositions of high molecular weight poly(hydroxy acid) polymer having good thermal stability and a weight average molecular weight of >100,000 by GPC. The compositions include one or more chain-terminator compounds/impurities which may be incorporated into the polymer and rendered harmless by the presence of appropriate amounts of bi-functional and multi-functional polymerization initiators, processes of preparing the polymer, and uses of the polymer to provide containers and polymer films or film-derived packages prepared therefrom.

9 Claims, 6 Drawing Sheets

POLY(GLYCOLIC ACID) FOR CONTAINERS AND FILMS WITH REDUCED GAS PERMEABILITY

CROSS REFERENCE TO RELATED APPLICATIONS

The present application is a Divisional of U.S. application Ser. No. 16/728,144, now allowed, having a filing date of Dec. 27, 2019 and which is related to U.S. application Ser. No. 16/728,123 filed on Dec. 27, 2019 which is incorporated herein by reference in its entirety.

BACKGROUND OF THE INVENTION

Field of the Invention

The invention relates to compositions and processes for improving gas barrier properties in a rigid polyester container or film wall, especially carbonated soft drink (CSD) bottles and flexible packaging for oxygen sensitive products.

Description of the Background

A gas barrier may be passive type, where there is a physical encumbrance to transit of diffusing gas molecules, or an active type, where special additives bind, react, scavenge, or entrap the diffusing gas molecule via a chemical reaction. Increasing polymer density to reduce molecular free volume mechanically falls under passive type, where the closely packed molecules with crystalline structure are relatively impervious to a diffusing gas molecule and gas molecule diffusion is greater within areas filled by less dense, less ordered, relatively open amorphous polymer structures.

Polyethylene terephthalate and co-polyesters of polyethylene terephthalate (polyethylene terephthalate and co-polyesters of polyethylene terephthalate are hereinafter referred to as PET) are preferred packaging materials for multi-serve and single-serve CSD and still beverages and food stuffs. Beverages commonly packaged with PET include carbonated soft drinks, juice, juice drinks, water, flavored water (still and carbonated), hydration drinks, teas, new age drinks, milk and milk drinks, etc. PET has a number of properties that make its use for packaging such drinks favorable. For example, PET has mechanical strength, e.g. drop impact strength, burst strength and thermal expansion when biaxially oriented, and gas barrier resistance, all of which make PET desirable as a packaging material for beverage containers and provide container design freedom.

Polyester resins such as poly(ethylene terephthalate) (PET), poly(butylene terephthalate) (PBT), poly(ethylene naphthalate) (PEN), poly(tri-methylene terephthalate) (PTT), and poly(tri-methylene naphthalate) (PTN), have conventionally been used as resins in the manufacture of food and beverage containers such as beverage bottles. Some resins such as PTT, PEN and PTN are used mainly for specialized packaging applications because these resins are significantly more expensive to manufacture than, for example, poly(ethylene terephthalate) resins. Properties such as flexibility, good impact resistance, and transparency, together with good melt processability, permit polyester resins to be widely used for making food and beverage containers. PET resins are among the most widely recycled plastics.

An important property of any polymer resin such as a PET resin used in food container or beverage container applications is the resin's ability to resist the ingress and egress of gases, such as oxygen ($O_2$) and carbon dioxide ($CO_2$), through the container's walls. Containers for carbonated beverages may be especially susceptible to the egress of gases such as carbon dioxide which are normally present in carbonated soft drinks. Usually, a carbonated soft drink will contain about 4 volumes of dissolved carbon dioxide gas per volume of the liquid carbonated soft drink. Other beverages such as beer typically have approximately 1.5 to 3.0 volumes of total dissolved carbon dioxide. If the resin used to form a beverage container permits carbon dioxide to escape, the product delivered to the consumer may be of unacceptable quality (e.g. "flat") if stored too long. In food container applications, it is important that the container material resists the ingress of oxygen. Oxygen in contact with a food substance may lead to color changes and oxidation that accelerates spoilage of the food product.

PET and the other aforementioned polyesters do not meet all of the gas barrier requirements for small size single serve drink containers (e.g., containers for serving sizes of less than 24 oz.). To be acceptable for single serve drink containers, a packaging container must be able to provide retention of $CO_2$ for carbonated soft drinks and exclusion of $O_2$ for oxygen sensitive drinks or in the case of beer, both $CO_2$ egress and $O_2$ ingress. Large, multi-serve containers made from PET generally meet the packaging requirements with respect to CO2 retention and/or $O_2$ exclusion and are thus able to maintain the quality of the product reaching the consumer after filling, shipping, storage and purchase. Similar performance in single-serve drink containers is desirable to meet consumer demand for smaller serving size to provide convenience, portability, and portion control. Beverage brand companies have long-standing market needs for distribution of single-serve plastic containers in multi-packs, e.g. 12- and 24-packs, with improved gas-barrier-related shelf life. This market segment is served primarily by aluminum cans due to shorter shelf life of single serve plastic containers.

Different technologies have been developed to enhance the gas barrier properties of PET packaging materials. For example, PET containers may be coated with an internal and/or external coating to improve gas barrier performance. Other methods for improving gas barrier performance of PET containers include the use polymer blends, co-monomer substitution, and multi-layers containers.

Certain technologies to improve gas barrier package performance, such as additional coating(s) or layer(s), typically require use of manufacturing equipment that is substantially more complicated, requires a greater initial capital outlay, and greater operating expenses. Although initially these economic demands may seem unfavorable, once the equipment investment has been committed the use of such technologies can be economically beneficial versus the alternatives of shorter shelf-life, greater product spoilage, and/or heavier packages. And if the coating/layering material(s) can be removed effectively from a predominantly PET container, then the recyclability of the container can be enhanced to be equivalent to that of a 100% PET container, but with the functional benefit of improved gas barrier.

Polymer blends are typically made from a mixture of a PET blended with another polyester material such as polyethylene naphthalate (PEN), polyethylene isophthalate (PEI) or other types of polymers such as polyamides (e.g., nylon). PET can also be modified by using co-monomers that are directly bonded to the polyester polymer chain. Co-acid monomer such as isophthalate-, naphthalate- and/or resorcinol-based co-diols may improve gas barrier performance.

However, in order for a PET copolymer to achieve even moderate improvement in gas barrier performance, e.g., preferably a 1.2× to 2× or greater barrier improvement factor (e.g., an improvement in gas barrier resistance of at least 20% to 100%), pure PET polymer typically requires the addition of 10-20 weight % or mole % of a beneficial co-monomer(s). This can substantially increase the PET resin cost and/or the complexity of the process used to manufacture the PET and bottles made from it, as well as create problems with other physical properties of the PET (e.g. clarity, color, or strength).

Crystallinity is an important factor in gas permeability of a polymer because the polymer crystals are relatively impermeable as compared with the amorphous regions within the polymer bulk. Thus, a permeant gas molecule must preferentially seek out amorphous regions in order to rapidly penetrate a polymer. A lower degree of crystallinity results in higher gas permeability. The polymer state with the highest degree of crystallinity provides the lowest gas permeation, thus a better gas barrier. Increasing the molecular order, packing, and crystallinity of gas barrier polymers increases density and decreases gas permeability. Thus, incorporating a polymer substantially more crystalline than PET can improve the gas barrier performance of a coated or multi-layer container predominantly comprised of PET.

Free volume, which exists in glassy polymers such as PET which have a glass transition temperature ($T_g$) that is substantially higher than ambient temperature, may affect a polymer film's ability to resist the passage of gases. Free volume is considered to be representative of unrelaxed volume of the polymer and represent the "open" spaces remaining in a polymer matrix that occur when a polymer becomes glassy and segmental mobility of the main polymer chain is "frozen."

Free volume in a glassy polymer may consist of two independent components, one of which is affected by annealing and the other by anti-plasticization. Anti-plasticization may occur when small amounts of certain plasticizers are added to certain glassy polymers. Anti-plasticization is only observed in the temperature regions below the glass transition temperature ($T_g$) of the polymer. Anti-plasticization arises from an interaction between the polymer and the plasticizer molecules and decreases the molecular mobility of the polymer and plasticizer. Anti-plasticizers are compounds which are compatible with PET resins and which contain one or more polar atoms such as oxygen, nitrogen, etc. and have at least one aromatic ring with or without a non-bridged ring.

Polyethylene isophthalate (PEI) made from 100% purified isophthalic acid has high-barrier properties and has a much lower $CO_2$ permeability than amorphous or crystalline PET. This can be considered to be a result of differences in the dynamic conformational flexibility between PEI and PET. In PEI, the meta-attachment of ethylene glycol units prevents the flipping of phenyl rings in the PEI polymer. Amorphous PET is able to freely flip its phenyl rings without changing its overall conformation, i.e., without moving or changing the conformation of the PET backbone. The free flipping of phenyl rings in PET may provide an effective pathway for gases to permeate through bottle side walls/films/sheets and may make PET more permeable to gases than PEI. In practice, PEI chips are completely amorphous and special drying procedures are needed to prevent stickiness. PEI will soften and agglomerate above $T_g$ (~60° C.). PEI should be dried at less than 50° C., preferably under vacuum. To resolve special drying conditions for chips and provide adequate crystallinity for chips, only a narrow range (~10-20%) of IPA can be present in the polymer backbone to offset the large use of expensive organic diluents. Otherwise, additional separate material dryers are required for this option.

The addition of a monomeric or polymeric organic molecule in small amounts to a base polymer (e.g., a polyester or co-polyester such as PET, PEI etc.) can result in anti-plasticization of the polymer whereby its resistance to gas permeability can improve. For example, the inclusion of tri-cresyl phosphate in polyphenylene oxide has been disclosed to lower the sorption of carbon dioxide and hence reduce the resin's permeability to carbon dioxide [Maeda, Y. and D. R. Paul, J. Polym. Sci., Part B: Polym. Phys. 25, 981-1003 (1987)]. Polymeric anti-plasticization of polycarbonate with polycaprolactone has also been reported [Siegmann, A., Polym. Eng. Sci., 1994].

The addition of low molecular weight compounds to PET is a technology that has been used to improve gas barrier performance in PET polymer films, bottles and containers for packaging applications. Such low molecular weight compounds are typically referred to as molecular barrier additives. When present as a mixture with PET, low molecular weight compounds occupy free volume within the polymer matrix and may interact with different polymer chains through polar groups on the low molecular weight compound and the polymer chains. Robeson and Faucher disclosed in J. Polymer Science (1969) that the presence of certain low molecular weight compounds in polymeric materials such as polycarbonate, polyvinyl chloride, poly(phenylene oxide), and poly(ethylene oxide) may lead to an increase in the modulus of the polymeric material and concurrently reduce gas permeability. These effects were thought to be due to an anti-plasticization effect. Anti-plasticization is an effect whereby the chains of polymers in a polymeric matrix and/or polymer-containing composition have secondary interactions with other molecules, e.g., with a further compound or with other polymer molecules present in the matrix.

Ruiz-Trevino and Paul disclosed that certain low molecular weight compounds may function to improve the gas barrier properties of polysulfone membranes and/or films. It was speculated that a mechanism that results in interaction of the polar groups of the compounds with the polar groups of the polysulfones reduces the free volume of the polysulfone compositions, for example by bringing the polysulfone chains closer to one another. The resulting composition thereby provided reduced the gas permeability. The low molecular weight compounds were present in amounts from 10 to 30% by weight.

U.S. Pat. No. 6,489,386 discloses compositions that include one or more PET polymers and methyl-4-hydroxybenzoate and/or a compound related thereto. The addition of an ester-containing additive was found to affect gas barrier properties.

U.S. 2006/0275568 discloses the use of di-alkyl esters of aromatic di-acids as additives for PET compositions. Improved gas barrier performance was obtained without any significant change in the intrinsic viscosity (IV) of the composition when certain catalysts such as Ti- and Al-containing catalysts were used and the compositions were otherwise free of catalyst metals such as Sb, Co, Ca, etc.

Inherent viscosity may be measured according to ASTM D4603-96 (e.g., IhV measured at 30° C. with 0.5% concentration in a 60/40 phenol/1,1,2,2-tetrachloroethane solution by means of a glass capillary viscometer). The IV (intrinsic viscosity) of a polymer, [□], is the limiting value of the inherent viscosity (IhV) at infinite dilution of the polymer. The IV (or IhV) units are in dL/g.

U.S. 2005/0221036 discloses the use of naphthalene dihydroxides in PET compositions. The inclusion of compounds of formula HO-AR-OH, where the AR group is a naphthalene-containing group, was shown to reduce the gas permeability of the polymer compositions.

U.S. 2007/0082156 discloses the use of a purine derivative, particularly a purine dione such as caffeine as an additive to PET to improve the oxygen and carbon dioxide barrier properties of the resulting beverage container.

Additional gas barrier references include U.S. Pat. Nos. 6,090,460, 6,461,697, 6,602,568, 6,808,820, 8,545,952 B2, U.S. 2005/0009976, U.S. 2011/0036850, and U.S. 2017/027018.

Thermoplastic PET resins are used in the packaging industry for rigid, semi-rigid, and flexible film containers. Commonly used rigid packages are containers for carbonated and non-carbonated beverages and food as well as non-food liquids, such as shampoos and household detergents. These containers can be made by a two-step process. In the first step a preform is produced by injection molding, and in the next step the preform is reheated and biaxially stretched and blown to give final container shape, size, and integrity with desirable thermo-mechanical properties.

As a pre-conditioning step prior to the injection molding process, the polyester resin(s), of similar species or physical mixtures have to be dried and fed from a drying hopper. They are then conveyed and melted by extrusion screw and injected under pressure into a mold. The mold may have one or more preform cavities to make a one or several preforms in a single cycle. The molded preform may have a single- or multi-layer structure type. In a single-layer application, the matrix composition is one polyester resin throughout the preform bulk.

In a multi-layer application, two or more different resins may be fed independent of each other to create a multilayered preform structure. For example, a three-layer bottle may have an ABA structure, where a middle layer of resin B is sandwiched between two structural layers of resin A on either side. The B layer is often a thin section of the wall, generally about 2% to 20% of the total preform wall thickness. The multi-layer bottles allow for a specialized resin, often with higher cost and/or with reduced compatibility with the PET structural layers, to be isolated in a specific location within the container. The final structure is ABA, the co-injection injection molding sequence is A, AB, A (where A is injected first, while A is being injected, B is introduced, then B is stopped and A continues until the final preform is packed out).

The timing sequence and mold temperatures can be adjusted to position the specialized B layer in the center of the preform or preferentially to the inside or outside of the preform wall. The sequence can also be managed to position the specialize B layer so that it only falls within the regions of the preforms that will eventually reheated and stretch blow molded. The advantage of this is to minimize or eliminate the specialize material from being in the thicker amorphous regions of the thread finish and base pushup regions that do not get stretched during the blowing process. This also allows for the total encapsulation of the specialized B polymer. A second option is to create a 5-layer structure ABABA via a sequential injection molding sequence A-B-A. In this case, A is injected first, and then stopped, B is injected next and then stopped, and then A is injected last packing out the preform. This creates two thin B layers due to the Fountain Flow filling of injection molding cavities.

In the blow molding step, preforms are loaded on a conveyor and are passed in front of infrared (IR) heating lamps to heat the preform typically 10-20° C. above the polymer glass transition temperature ($T_g$) prior to the stretching and blowing steps. The preform is thicker and shorter than the final container wall to account for the self-leveling of the polymer and the resulting axial and hoop stretch ratios (blow up ratio BUR) of the final container shape. To reheat the preform uniformly, typically, a low concentration of IR absorbing species, called reheat or fast heat up additive, are added to the polymer to improve the absorption of IR-radiation by the polyester preform and subsequently conduct heat into the surrounding preform wall section.

The preform reheating process is inefficient. The JR selective wave-length lamps radiate energy to penetrate the PET preform, but also require air circulation to cool the preform surfaces during the reheating process due to the low heat conductivity of the PET. Not cooling the preform surface can result in overheating and the onset of crystallization of the surfaces rendering the container opaque or hazy.

On application side, the stretch blow molded PET containers offer convenience of meeting physical and other application requirements such as dimensional stability, clarity, cost, and recyclability. However, unmodified PET containers have relatively high gas permeability and may allow diffusion of gas molecules in both directions across the container wall. In a typical CSD package, the container is pressurized to in excess of 4 volumes of $CO_2$, which over a span of several weeks will be absorbed into and diffused through the container sidewalls, lowering the carbonation level below the minimum that is known to affect the tasted of the product. In the case of some food type products, e.g., ketchup bottles, oxygen from the ambient air will ingress into the container and can alter the taste and color of the product. In either case, absorption and diffusion of gas molecules through the walls of the PET plastic container may limit the product's shelf life.

CSD product shelf life is adversely affected for smaller packages which have higher ratio of surface area to volume and therefore suffer relatively higher gas-permeation carbonation loss than larger volume containers.

The shelf life for these containers can be increased by improving gas barrier properties of the plastic container. A barrier layer within a container may be 'passive' or 'active' or a combination of both.

With a passive barrier, gas diffusion may be retarded by combining PET with more impervious copolymers or by increasing the diffusive path length by increasing tortuosity of a less resistive pathway. MXD6 nylon and EVOH are just two examples of barrier type polymers that are commonly used to accomplish the former, while exfoliated clays may be used for the latter. A passive gas barrier retards diffusion of $CO_2$ and/or $O_2$. However, it does not stop the flux of gas molecules in or out of the container wall.

An active gas barrier, e.g. an oxygen scavenging molecule, involves reaction and subsequent immobilization of gas molecules with a polymeric or other compound, typically in presence of a catalyst. Over time, continued oxygen ingress can exhaust the reactive species. Therefore, active barrier systems can attain longer shelf life if the underlying permeability of the base polymer container is also enhanced to retard gas diffusion.

A straightforward way of improving gas barrier is to thicken the container wall, since greater thickness can increase the diffusive path length of a permeant gas. However, such a solution is generally not preferred as it increases the container cost as more material and energy are consumed to make such a container. In addition, a thicker container has an adverse environmental footprint due to its increased weight, production energy, and transportation fuel consumption. While not a preferred option, this approach imposes an upper limit constraint on the additional cost incurred to improve gas barrier performance.

The specialized nature of both active and passive gas barrier systems makes them significantly more expensive than the base PET resin. Between the high cost of these special polymers, such as MXD6 and EVOH, and the option of increasing PET container thickness, one commercial solution is to put these special barrier polymers into a multi-layer structured container such that a dedicated, but thin, layer(s) of the expensive barrier polymer is used. In a three-layer container, the middle layer may be 1.5% to 15% of the average container thickness, and therefore a similar minority percentage of the overall container weight, allowing of course, for material density differences.

Nylon based special gas barrier resins have deficiencies, even when used in relatively small amounts. They can delaminate during or after blow molding due to insufficient adhesion between layers, cause undesirable yellow color and/or haze, and act as a contaminate in the existing post-consumer PET recycling streams.

The recyclability issue with nylon based PET containers is important. A relatively small amount of these additives, which may help prolong shelf-life for consumers by some weeks, can render the entire, predominantly-PET container unattractive for recycling.

Poly(glycolic acid), or PGA, polymer has been proposed as an attractive passive gas barrier layer (typically, B-layer) for packaging applications. PGA is attractive, in part or in whole, due to its small molecule repeating unit, high degree of polymer chain flexibility, tight molecular packing, high degree of crystallinity, and high density, as compared with PET. All of these features of PGA polymer can be associated with lower gas permeability (e.g. better gas barrier) versus PET.

PGA is also attractive as a gas barrier in multi-layer container structures because of its relatively low impact on the PET recycling process. PGA rapidly de-polymerizes and dissolves in aqueous caustic solutions typically employed for bottle and/or flake washing in PET recycling operations. Therefore, PGA can be easily separated and removed from Recycled PET (RPET) process and product so that it does not contaminate new production of containers utilizing RPET content.

Ease of PGA de-polymerization, while good for PET recycling, presents a challenge to producing sufficiently high molecular weight PGA with sufficiently high melt-viscosity, that can be melt-processed together with PET to cost-effectively manufacture a high-quality, multi-layer container with enhanced gas barrier performance.

Several previous disclosures have described technical aspects relevant to the pursuit of stable, high-molecular weight PGA or poly(lactic acid), or PLA, or co-polymers of PGA and PLA. This includes: U.S. Pat. No. 5,470,955 generally describes similarities between PLA and PGA polymers and methods of making PLA/PGA. Pre-polymerization is directed towards forming end-capped polymers with terminal amide and/or other groups.

U.S. 2015/0291733 describes polyesters that include an aromatic or hetero-aromatic portion which distinguishes from aliphatic polyesters such as PGA. Di-functional monomers such as adipic acid can be used as co-monomers when the acid is subject to polymerization in the presence of a metal-based catalyst.

U.S. Pat. No. 5,936,045 describes a process for making polyether esters containing at least 20% adipic acid monomer units. No pre-polymer formation is described.

U.S. Pat. No. 8,362,158 describes ring-opening polymerization of a glycolide (i.e. a glycolic acid cyclic dimer) with the use of a metal-based ring-opening catalyst. Adipic acid may be present as a co-monomer and oxazolines may be used as end-capping groups.

U.S. 2014/0148534 describes a process for making a polymer by reacting a starch with a low molecular weight PGA.

WO 2016/071574 describes prior work of some of the present inventors. Catalysts used for the formation of PGA from glycolic acid are sulfonic acid-based. The pre-polymer has a hydroxyl group termination of greater than 50%.

U.S. 2016/0060387 describes the use of a conventional metal-based polymerization catalyst to for a PGA pre-polymer with high hydroxyl group termination.

U.S. Pat. No. 8,987,343 describes polymerization of a hydroxy-acid to form a three-dimensional network. Polymerization is carried out in the solid-state.

U.S. Pat. No. 10,035,876 describes polymerization of a hydroxy-acid to form a three-dimensional network that gives rise to non-Newtonian viscoelastic behavior in the melt state.

U.S. 2006/0047088 describes a process in which PGA is made by catalyzed ring-opening of a cyclic dimer.

U.S. 2014/0024769 describes the use of ring-opening catalysis to for PGA from glycolide that is derived from biomass. Pre-polymerization may be carried out with adipic acid. The pre-polymer may be chain lengthened by exposure to an oxazoline.

SUMMARY OF THE INVENTION

The present disclosure relates to reduction of gas molecule permeability through a polyethylene terephthalate (PET) polyester film or container wall by introducing a discrete layer of a poly(hydroxy acid) (e.g., poly(glycolic acid) or PGA) to inhibit the diffusion of gas molecules into and/or out of the food or beverage container. In one embodiment the present disclosure relates to a PGA composition that contains a stable, high molecular weight, high-viscosity PGA polymer that can be co-processed with PET into multi-layer structures (e.g. containers, films, etc.) having excellent gas barrier and recyclability characteristics. The poly(glycolic acid) of this invention has a particular structure and its method of production is especially efficient and utilizes a small manufacturing footprint.

High molecular weight PGA can be produced by pre-polymerizing (polycondensing) glycolic acid (GA) followed by chain-extension to achieve a desired molecular weight.

Chain-terminating compounds that can inhibit polymerization are included in the PGA polymer and rendered harmless in a preferred embodiment of this disclosure.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
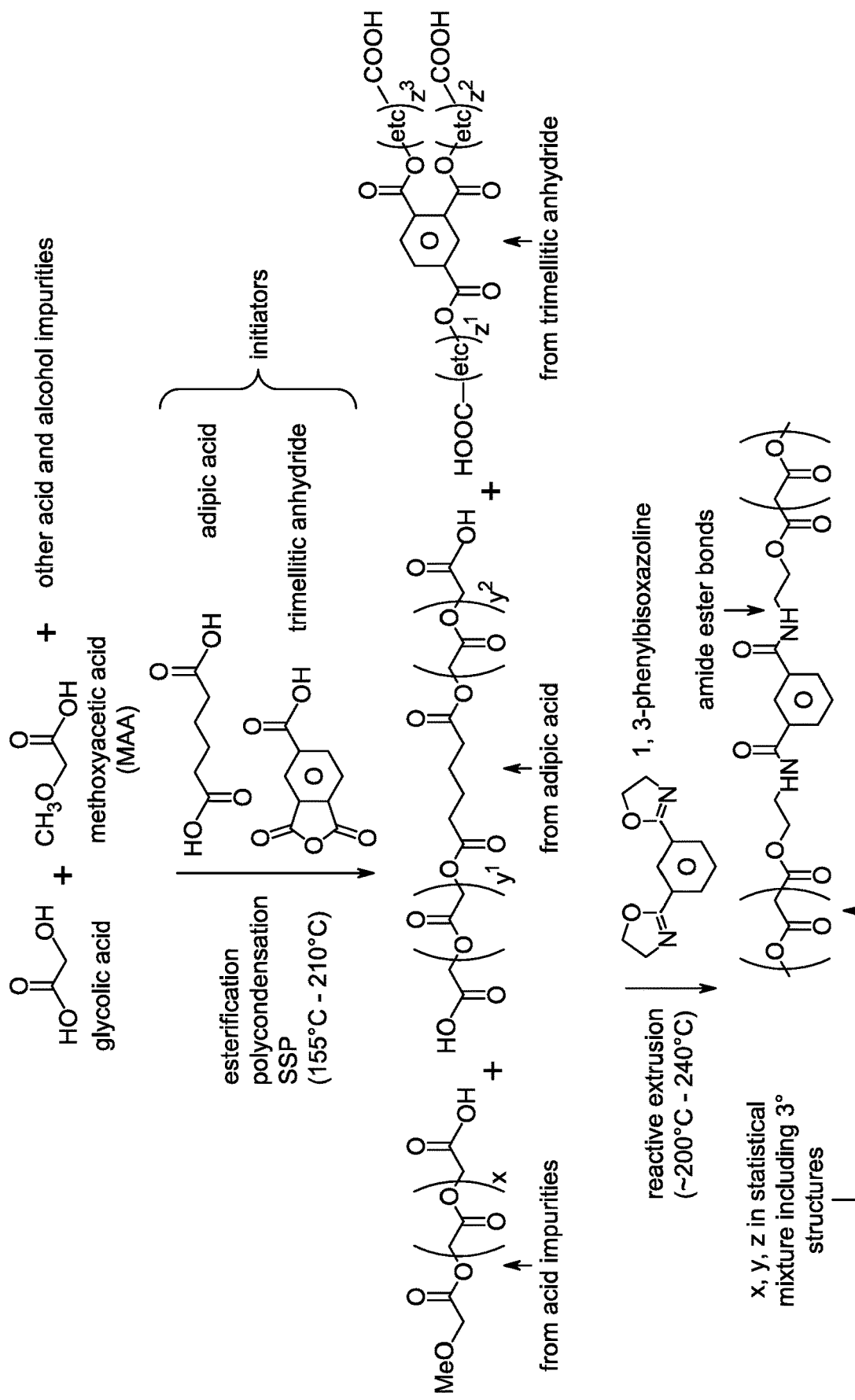
FIG. 1 describes the chemistry of forming a poly(hydroxy acid) polymer.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

The membrane, layer or methods disclosed herein can "comprise", "consist essentially of", or "consist of" particular components, compositions, method steps disclosed throughout the specification. A membrane or layer consisting essentially of the components as defined herein does not exclude materials that do not materially affect the basic and novel characteristic(s) of the membrane or layer. For example, other components may be included in the membrane or layer so long as the other components do not substantially change the surface morphology, gas barrier resistance, and/or stiffness.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components.

The present disclosure includes a composite membrane or layer, containing, comprising, consisting essentially of, or consisting of a poly(hydroxy acid) polymer such as a poly(glycolic acid) polymer (PGA).

The composite membrane or layer disclosed herein may be a thin film membrane, a flat sheet membrane, a tubular membrane, and/or embodied as a sealable container. The composite membrane or layer may be in the form of various shapes, for example, flat (e.g., for a disc-shaped membrane), bent, curved (e.g., a cylinder shaped membrane), and rippled. In one embodiment, a surface of the composite membrane is curved. In a preferred embodiment, the surface of the composite membrane is curved and forms a bottle having an opening and cavity defined by the membrane or film. The composite membrane may have microscopic wrinkles, pores, bumps, ridges, etc. and still have a substantially "flat" macrostructure.

In one embodiment, the composite membrane or layer is a thin film having a thickness of 20-2,000 µm, 25-1,500 µm, 50-1,000 µm, 100-800 µm, 200-600 µm, 250-500 µm, or 300-400 µm. In a preferred embodiment, the composite membrane or layer is cylindrical and has a diameter of 10-100 mm, 20-80 mm, 30-60 mm, 40-50 mm, or about 47 mm.

The present disclosure includes a multi-step process that uses a coupling agent for producing stable, high molecular weight, high viscosity poly(hydroxy acid) polymer (e.g., poly(glycolic acid) PGA polymer). Of particular interest are (1) the multi-step melt-solid-melt phase process which provides a stable intermediate polymer with high percentage of carboxyl-terminated chain ends and a final polymer with suitably high molecular weight, and (2) the capability to render harmless any deleterious chain-terminating compounds typically found in less purified (technical) grades of glycolic acid (GA), as compared to more pure cosmetic-grade glycolic acid.

The process described in the present disclosure forms a poly(hydroxy acid) polymer such as a poly(glycolic acid) polymer, or a copolymer thereof, by one or more polycondensation reactions. The polycondensing is preferably carried out in the presence of an acid catalyst to increase molecular weight and/or to form telechelic polymers having high thermally stability. A step-growth polycondensing (e.g., solid state polycondensation) process provides a final poly(hydroxy acid) polymer of high molecular weight and high thermal stability. FIG. 1 provides a simplified description of the chemical reactions of a process for forming a poly(hydroxyl acid) polymer.

In another preferred embodiment of the invention, chain-terminating compounds which exist in certain commercial grades of glycolic acid raw materials intended for non-cosmetic end-uses, may be rendered harmless by addition of multi-functional reaction initiator(s) at the onset of liquid/melt-phase polycondensation. In the context of the present disclosure harmless conveys that an impurity-containing hydroxyl acid (e.g., glycolic acid) feedstock may be used for forming a poly(hydroxy acid) polymer (e.g., PGA) that provides the same or similar chemical and physical properties in comparison to a corresponding polymer made with a feedstock that is free of the impurities or contains such impurities in substantially lesser amounts such as 30% fewer impurities, preferably 40%, 50%, 60%, 70% 80% or 90% fewer impurities.

The multi-functional initiator gives rise to multi-branched polymer chains which continue to polymerize, either during polycondensation or reactive extrusion chain extension, or both, even when a chain-terminator (e.g., an impurity that acts to terminate polymerization or polymer chain extension) reacts into one or more branches of the polymer chain. Additionally, the presence of the multi-functional reaction initiator in conjunction with a di-functional reaction initiator may also effectively diminish chain terminated polymer formation (e.g., a linear polymer especially short linear polymer chains) and the consumption of hydroxy acid monomers caused by these chain terminators which are present in the feedstock monomers of embodiments the present disclosure. Of the chain terminators, acid compounds in general and specifically methoxyacetic acid (MAA) may be present. MAA, because it has only one reactive end group, can inhibit polymerization of linear poly(glycolic acid). Once MAA is incorporated into a linear, diol- or di-acid-initiated polymer chain it inhibits polymer growth by terminating chain growth at the polymer end to which it has reacted. Similarly, chain-terminating hydroxyl compounds can inhibit polycondensation and chain extension of linear, di-acid- or diol-initiated poly(hydroxy acid) polymer. Chain-terminating compounds may be present in an amount of 0.01 to 5% by weight based on the weight of the glycolic acid (or other hydroxy acid such as lactic acid) raw material, preferably 0.02 to 2% by weight, more preferably 0.05 to 1% by weight, and most preferably 0.1 to 0.5% by weight.

Statistically, as greater amounts of a multi-functional initiator are added to the starting recipe (e.g., a reaction mixture that comprises a hydroxy acid monomer and associated impurities, catalyst and/or initiator), the less impact the chain-terminating compounds will have on (1) reaction rate, (2) completion of polymerization, and (3) ultimate molecular weight of the poly(hydroxy acid) polymer. However, increasing the total concentration of reaction initiators, whether di- or multi-functional, will necessarily result in lower intermediate polymer molecular weight and/or less extendable polymer chains.

Thus, there exists a preferred balance among the (A) di-functional initiator, (B) multi-functional initiator, and (C) chain-terminating compounds which results in the most desirable high molecular weight intermediate polymer and structure of the final poly(hydroxy acid) polymer and which also permits acceptable reaction kinetics to efficiently form a polymer product In order for the final polymer to have a suitable balance of properties (A) should have a weight percentage of less than 3.0% of the final polymer, (B) should have a weight percentage of less than 1.2% of the final polymer, and (C) should have a weight percentage of less than 1% of the final polymer. Preferably, (A) has a weight percentage between 0.5 and 2.5% of the final polymer, (B) has a weight percentage between 0.2 and 1.0% of the final polymer, and (C) has a weight percentage between 0.1 and 1.0% of the final polymer. More preferably, (A) has a weight percentage between 0.75 and 2.0% of the final polymer, (B) has a weight percentage between 0.3 and 0.8% of the final polymer, and (C) has a weight percentage between 0.1 and 0.7% of the final polymer. And most preferably, (A) has a weight percentage between 1.0 and 1.5% of the final polymer, (B) has a weight percentage between 0.4 and 0.6% of the final polymer, and (C) has a weight percentage between 0.15 and 0.45% of the final polymer.

From the preferred combination of ingredients we see that final polymer properties may be influenced by the combination of linear and branched polymer chains which are typically present in the intermediate polymer. In one embodiment the linear polymer chains are comprised of mono-functional and di-functional polymer chains, where a mono-functional chain may be initiated from ingredient (C) and a di-functional chain may be initiated from ingredient (A). The mono-functional polymer chain may be formed by chain extensions from only a single end (e.g., polymerization site) whereas the di-functional polymer chain may be formed by chain extensions from two ends (e.g., two polymerization sites). Poly-functional or branched polymer chains may be formed by chain extension directly from ingredient (B).

By number, the ratio of linear chains to branched chains in the intermediate polymer is preferably 7-3:1, preferably 6-4:1 or about 5-4.5:1. More preferably, the number ratio of linear to branched intermediate polymer chains should be between 4 to 1 and 6 to 1. And most preferably, the number ratio of linear to branched chains should be about 4.5 to 1 in the intermediate polymer.

During reactive extrusion linear chains may combine with other linear chains to form larger but fewer linear chains. Linear chains may also combine with branched chains to eliminate linear chains in favor of larger branched chains. Following reactive extrusion and the combination of linear and branched intermediate polymer chains into the final polymer, the number ratio of linear to branched chains decreases. Preferably, the number ratio of linear to branched chains in the final polymer is less than 4:1, more preferably less than 3:1, and most preferably between about 2:1 to about 1:1. However, if the number ratio of linear to branched chains in the final polymer is too small, for example less than 1:1, the physical properties of the final polymer may become unsuitable for downstream melt processing. For example, excessive branching may directly cause the final polymer melt viscosity to be too high for injection molding of multi-layer containers. Alternatively, excessive final polymer branching may lead to polymer property instability due to thermal degradation, cross-linking or other related phenomena.

The majority of the hydroxy acid monomer is preferably glycolic acid, L-lactic acid and/or D-lactic acid. Particularly interesting compositions of the poly(hydroxy acid) polymer and copolymer include, in addition to glycolic acid:

one or more organic linear, branched, cyclic, aromatic or polymeric monomers containing two or more hydroxy, carboxylic acid, or thiol groups, and/or a hydroxy acid co-monomer, or its equivalent lactone, of general formula:

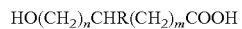

$HO(CH_2)_nCHR(CH_2)_mCOOH$ wherein

R is independently selected from a group consisting of hydrogen, linear alkyl, alkenyl alkynyl, branched alkyl, cyclic alkyl and aryl moieties, and n and m are integers which can independently vary between 0 and 20.

In a particularly preferred embodiment, the molar ratio between residues derived from glycolic acid (or hydroxy acid) and residues derived from a co-monomer is 1000:1 or less, for example 500:1 or less, suitably 300:1 or less, advantageously 45:1 to 55:1, in particular 48:1 to 52:1.

In one embodiment, the polycondensation (e.g., the formation of a poly(hydroxy acid) polymer by reaction of hydroxy acid monomer in the presence of an initiator and/or catalyst) is initiated with a diol or a di-acid. For diol initiation the initiators (which can also serve as co-monomers) are preferably selected from hydroxy-terminated compounds (diols, triols, tetraols, pentaols), such as propanediol, butanediol, hexanediol, pentaerythriol and oligomeric polyethylene glycol and combinations thereof, to produce a hydroxy-terminated telechelic polymer. Other diols or di-acids may include an aliphatic polyvalent carboxylic acid, an aliphatic polyhydric alcohol, aliphatic hydroxycarboxylic acid, and aliphatic lactone, specifically, aliphatic polyvalent carboxylic acids such as succinic acid, adipic acid, sebacic acid, and fumaric acid, or derivatives thereof, aliphatic polyhydric alcohols such as ethylene glycol, propylene glycol, butanediol, hexanediol, octanediol, neopentyl glycol, glycerin, isosorbide, trimethylolpropane, pentaerythritol, an aliphatic polyvalent alcohol in which ethylene oxide or propylene oxide is added to trimethylolpropane or pentaerythritol, diethylene glycol, triethylene glycol, polyethylene glycol, and polypropylene glycol, or derivatives thereof, aliphatic hydroxycarboxylic acids such as lactic acid, citric acid, malic acid, glycolic acid, 3-hydroxybutyric acid, 4-hydroxybutyric acid, 4-hydroxyvaleric acid, and 6-hydroxycaproic acid, and aliphatic lactones such as glycolide, ε-caprolactone, ε-caprolactone, β-propiolactone, δ-butyrolactone, δ- or γ-butyrolactone, pivalolactone, and δ-valerolactone. A mixture of component units may be used. The multifunctional initiator preferably includes trimellitic acid, glycerol, pentaerytritol, and/or trimethylol.

The thermal stability of the final polymers and copolymers thus produced are good, typically exhibiting a glass transition point in excess of 35° C., preferably in excess of 37° C. and even up to 50° C., and decomposition temperatures, $T_{d\ 10}\%$ of at least 280° C., in particular at least 295° C.

The polycondensation is preferably carried out in the presence of a catalyst which is preferably an inorganic compound, such as antimony, tin, or cobalt. In addition, a sulphonic acid-containing organic compound may be used, preferably in combination with the inorganic compound. The amount of the inorganic and/or organic compound(s) is preferably from 0.001 to 0.5% by weight of the glycolic acid together with the co-monomers, more preferably 0.002 to 0.2% by weight, even more preferably 0.005 to 0.1% by weight, and most preferably 0.01 to 0.05% by weight.

The sulfonic acid group-containing organic compound preferably has a boiling point of 200° C. or higher or a melting point of 160° C. or higher at atmospheric pressure. Further preferable is a sulfonic acid group-containing organic compound having a melting point of 180° C. or higher. Examples include aromatic sulfonic acids such as n-butylbenzenesulfonic acid, n-octylbenzenesulfonic acid, n-dodecylbenzenesulfonic acid, pentadecylbenzenesulfonic acid, 2,5-dimethylbenzenesulfonic acid, 2,5-dibutylbenzenesulfonic acid, o-aminobenzenesulfonic acid, m-aminobenzenesulfonic acid, p-aminobenzenesulfonic acid, 3-amino-4-hydroxybenzenesulfonic acid, 5-amino-2-methylbenzenesulfonic acid, 3,5-diamino-2,4,6-trimethylbenzenesulfonic acid, 2,4-dinitrobenzenesulfonic acid, 2,5-dichlorobenzenesulfonic acid, p-phenolsulfonic acid, cumenesulfonic acid, xylenesulfonic acid, o-cresolsulfonic acid, m-cresolsulfonic acid, p-cresolsulfonic acid, 2-naphthalenesulfonic acid, 1-naphthalenesulfonic acid, isopropylnaphthalenesulfonic acid, dodecylnaphthalenesulfonic acid, dinonylnaphthalenesulfonic acid, dinonylnaphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, 4,4-biphenyldisulfonic acid, anthraquinone-2-sulfonic acid, o-benzenedisulfonic acid, m-benzenedisulfonic acid, p-benzenedisulfonic acid, 2,5-diamino-1,3-benzenedisulfonic acid, phenol-2,4-disulfonic acid, aniline-2,4-disulfonic acid, anthraquinone-1,5-disulfonic acid, benzidinedisulfonic acid, 1-naphthol-2-sulfonic acid, 2-naphthol-3,6-disulfonic acid, 2-naphthol-6,8-disulfonic acid, 1,3,5-benzenetrisulfonic acid, and polystyrenesulfonic acid, and aliphatic sulfonic acids and alicyclic sulfonic acids such as n-octylsulfonic acid, pentadecylsulfonic acid, 1,2-ethanedisulfonic acid, 1,3-propanedisulfonic acid, methanedisulfonic acid, 1,4-butane-disulfonic acid, pentanedisulfonic acid, hexanedisulfonic acid, heptanedisulfonic acid, octane-disulfonic acid, nonanedisulfonic acid, decanedisulfonic acid, 1,11-undecanedisulfonic acid. 1, 12-dodecanedisulfonic acid, catechol-3,5-disulfonic acid, cyclopentanesulfonic acid, cyclohexanesulfonic acid and camphorsulfonic acid, taurine, dinonylnaphthalenedisulfonic acid, 1,5-naphthalenedisulfonic acid, 1,6-naphthalenedisulfonic acid, 2,6-naphthalenedisulfonic acid, 2,7-naphthalenedisulfonic acid, 1,3,6-naphthalenetrisulfonic acid, 4,4-biphenyldisulfonic acid, o-benzenedisulfonic acid, m-benzenedisulfonic acid, p-benzenedisulfonic acid, 2,5-diamino-1,3-benzenedisulfonic acid, phenol-2,4-disulfonic acid, aniline-2,4-disulfonic acid, anthraquinone-1,5-disulfonic acid, benzidinedisulfonic acid, 2-naphthol-3,6-disulfonic acid, 2-naphthol-6,8-disulfonic acid, 1,3,5-benzenetrisulfonic acid, and polystyrenesulfonic acid.

Inorganic catalysts such as metal catalysts include metal compounds such as tin compounds, titanium compounds, lead compounds, zinc compounds, cobalt compounds, iron compounds, lithium compounds, and rare earth compounds and, as a kind of the compounds, metal alkoxide, metal halide, organic carboxylate, carbonate, sulfate, and oxide are preferable. Specifically, examples include tin compounds such as a tin powder, tin (II) chloride, tin (IV) chloride, tin (II) bromide, tin (IV) bromide, ethoxytin (II), t-butoxytin (IV), isopropoxytin (IV), tin (II) acetate, tin (IV) acetate, tin (II) octylate, tin (II) laurate, tin (II) myristate, tin (II) palmitate, tin (II) stearate, tin (II) oleate, tin (II) linolate, acetylacetone tin (IT), tin (II) oxalate, tin (TT) lactate, tin (IT) tartarat, tin (TI) pyrophosphate, tin (II) p-phenolsulfonate, tin (II) bis(methanesulfonate), tin (II) sulfate, tin (II) oxide, tin (IV) oxide, tin (II) sulfide, tin (IV) sulfide, dimethyltin (IV) oxide, methylphenyltin (IV) oxide, dibutyltin (IV) oxide, dioctyltin (IV) oxide, diphenyltin (IV) oxide, tributyltin oxide, triethyltin (IV) hydroxide, triphenyltin (IV) hydroxide, tributyltin hydride, monobutyltin (IV) oxide, tetramethyltin (IV), tetraethyltin (IV), tetrabutyltin (IV), dibutyldiphenyltin (IV), tetraphenyltin (IV), tributyltin (IV) acetate, triisobutyltin (IV) acetate, triphenyltin (IV) acetate, dibutyltin diacetate, dibutyltin dioctanoate, dibutyltin (IV) dilaurate, dibutyltin (IV) maleate, dibutyltin bis (acetylacetonate), tributyltin (IV) chloride, dibutyltin dichloride, monobutyltin trichloride, dioctyltin dichloride, triphenyltin (IV) chloride, tributyltin sulfide, tributyltin sulphate, tin (II) trifluoromethanesulfonate, ammonium hexachlorostannate, dibutyltin sulfide, diphenyltin sulfide, triethyltin sulfate and phthalocyanine tin (II) and, among them, tin compounds other than tin (II) chloride arepreferable.

Titanium compounds such as titanium methoxide, titanium propoxide, titanium isopropoxide, titanium butoxide, titanium isobutoxide, titanium cyclohexide, titanium phenoxide, titanium chloride, titanium diacetate, titanium triacetate, titanium tetraacetate, and titanium (IV) oxide. Lead compounds include diisopropoxylead (II), lead monochloride, lead acetate, lead (II) octylate, lead (II) isooctanoate, lead (II) isononanate, lead (II) laurate, lead (II) oleate, lead (II) linolate, lead naphthenate, lead (II) neodecanoate, lead oxide, and lead (II) sulfate, zinc compounds include zinc powder, methylpropoxyzinc, zinc chloride, zinc acetate, zinc (II) octylate, zinc naphthenate, zinc carbonate, zinc oxide, and zinc sulfate, cobalt compounds include cobalt chloride, cobalt acetate, cobalt (II) octylate, cobalt (II) isooctanoate, cobalt (II) isononanate, cobalt (II) laurate, cobalt (II) oleate, cobalt (II) linolate, cobalt naphthenate, cobalt (II) neodecanoate, cobalt (II) carbonate, cobalt (II) sulfate, and cobalt (II) oxide, iron compounds include iron (II) chloride, iron (II) acetate, iron (II) octylate, iron naphthenate, iron (II)

carbonate, iron (II) sulfate, and iron (II) oxide, lithium compounds such as propoxylithium, lithium chloride, lithium acetate, lithium octylate, lithium naphthenate, lithium carbonate, dilithium sulfate, and lithium oxide, and rare earth compounds such as triisopropoxyeuropium (III), triisopropoxyneodymium (III), triisopropoxylanthanum, triisopropoxy-samarium (III), triisopropoxyyttrium, isopropoxyyttrium, dysprosium chloride, europium chloride, lanthanum chloride, neodymium chloride, samarium chloride, yttrium chloride, dysprosium (III) triacetate, europium (III) triacetate, lanthanum acetate, neodymium triacetate, samarium acetate, yttrium triacetate, dysprosium (III) carbonate, dysprosiun1 (IV) carbonate, europium (II) carbonate, lanthanum carbonate, neodymium carbonate, samarium (II) carbonate, samarium (III) carbonate, yttrium carbonate, dysprosium sulfate, europium (II) sulfate, lanthanum sulfate, neodymium sulfate, samarium sulfate, yttrium sulfate, europium dioxide, lanthanum oxide, neodymium oxide, samarium (III) oxide, and yttrium oxide.

Other metal compounds include potassium isopropoxide, potassium chloride, potassium acetate, potassium octylate, potassium naphthenate, tert-butyl potassium carbonate, potassium sulfate, and potassium oxide, copper compounds such as copper (II) diisopropoxide, copper (II) chloride, copper (II) acetate, copper octylate, copper naphthenate, copper (II) sulfate, and dicopper carbonate, nickel compounds such as nickel chloride, nickel acetate, nickel octylate, nickel carbonate, nickel (II) sulfate, and nickel oxide, zirconium compounds such as tetraisopropoxyzirconium (IV), zirconium trichloride, zirconium acetate, zirconium octylate, zirconium naphthenate, zirconium (II) carbonate, zirconium (IV) carbonate, zirconium sulfate, and zirconium (II) oxide, antimony compounds such as triisopropoxyantimony, antimony (III) fluoride, antimony (V) fluoride, antimony acetate, and antimony (III) oxide, magnesium compounds such as magnesium diisopropoxide, magnesium chloride, magnesium acetate, magnesium lactate, magnesium carbonate, magnesium sulfate, and magnesium oxide, calcium compounds such as diisopropoxycalcium, calciun1 chloride, calcium acetate, calcium octylate, calcium naphthenate, calcium lactate, and calcium sulfate, aluminum compounds such as aluminum, aluminum isopropoxide, aluminum chloride, aluminum acetate, aluminum octylate, aluminum sulfate, and aluminum oxide, gennanium compounds such as germanium, tetraisopropoxygermane, and germanium (IV) oxide, manganese compounds such as triisopropoxymanganese (III), manganese trichloride, manganese acetate, manganese (II) octylate, manganese (II) naphthenate, and manganese (II) sulfate, bismuth compounds such as bismuth (III) chloride, bismuth powder, bismuth (III) oxide, bismuth acetate, bismuth octylate, and bismuth neodecanoate.

An acid catalyst other than the sulfonic acid group-containing compound may be a Bronsted acid which is a proton donor, or a Lewis acid which is an electron pair acceptor, and may be either an organic acid or an inorganic acid. Examples include monocarboxylic acid compounds such as formic acid, acetic acid, propionic acid, heptanoic acid, octanoic acid, octylic acid, nonanoic acid, isononanoic acid, trifluoroacetic acid and trichloroacetic acid, dicarboxylic acid compounds such as oxylic acid, succinic acid, maleic acid, tartaric acid and malonic acid, tricarboxylic acid compounds such as citric acid and tricarballylic acid, acidic amino acids such as aspartic acid and glutamic acid, ascorbic acid, retinoic acid, phosphoric acid, metaphosphoric acid, phosphorous acid, hypophosphorous acid, polyphosphoric acid, phosphoric acid monoester such as monododecyl phosphate and monooctadecyl phosphate, phosphoric acid diester such as didodecyl phosphate and dioctadecyl phosphate, phosphoric acid compounds such as phosphorous acid monoester and phosphorous acid diester, boric acid, hydrochloric acid, and sulfuric acid. In addition, the acid catalyst other than the sulfonic acid group-containing compound is not particularly limited in a shape, and may be any of a solid acid catalyst and a liquid acid catalyst, and examples of the solid acid catalyst include natural minerals such as acid clay, kaolinite, bentonite, montmorillonite, talc, zirconium silicate and zeolite, oxides such as silica, alumina, titania and zirconia, or oxide complexes such as silica alumina, silica magnesia, silica boria, alumina boria, silica titania and silica zirconia, chlorinated alumina, fluorinated alumina, and cation exchange resin.

The process includes a liquid/melt-phase polymerization, followed by a solid-state polymerization, followed by a melt-phase chain-extension in an extruder. PGA is relatively sensitive to high temperatures. However, production of PGA with the desired structure (high molecular weight and end-group composition) requires long polymerization times at elevated temperatures. In one embodiment the process includes a pre-polymerization step in which a hydroxy acid monomer is subject to two steps: (1) condensation polymerization of glycolic acid in the liquid/melt phase at temperatures of 190-220° C. followed by (2) solid-state polymerization (SSP) at temperatures of 140-185° C. which is below the melt-point of the polymer but high enough for the polycondensation reaction to proceed. Conventionally, the transition between liquid/melt and solid phase steps was accomplished via a relatively complicated procedure including emptying the reactor after pre-polymerization, then solidifying, crushing, grinding, and sieving the pre-polymer followed by SSP in a separate second reactor.

In a preferred embodiment of the present disclosure, both liquid/melt condensation polymerization and SSP are conducted in a single reactor including solidifying between the two reaction stages without emptying, crushing, grinding or sieving outside the reactor between the two reaction stages. A Lodige-type vacuum paddle dryer equipped with strong mixer blades, high-speed homogenizer mixer, and heating/cooling jacket is preferred for this process. All ingredients are introduced into the reactor at ambient temperature and pressure. The reactor is then sealed and under constant agitation the temperature in increased so as to boil off the excess water typically included with the hydroxy-acid. Once the water has been removed, the reactor temperature is raised to the reaction temperature (nominally 200° C.). The ingredients undergo melt-phase reaction for 1-5 hours to form a poly(hydroxy acid) pre-polymer. Following conclusion of the melt-phase, solidification of poly(hydroxy acid) pre-polymer is done by rapidly lowering the reactor jacket temperature. During precipitation and solidification, PGA pre-polymer (e.g., precursor to the intermediate polymer) spontaneously crystallizes. Pre-polymer solidified after liquid/melt polycondensation is sufficiently brittle for the homogenizer mixer to grind the solidifying material in-situ and form sufficiently fine particles for the SSP reaction to proceed with satisfactory speed. The SSP reaction may be carried out for 24-96 hours at temperatures between 140-180° C. After SSP, the solid-stated pre-polymer (referred to as intermediate polymer) can be removed from the reactor as a solid powder with particle size suitable for chain extension to be performed in a melt extruder. Notably, these preferred embodiments save investment and operations costs.

After removal from the Lodige type reactor, an intermediate polymer with weight-average molecular weight ($M_w$)

as measured by Size Exclusion (Gel Permeation) Chromatography (GPC) between 15,000 and 40,000 must be dried to less than 50 ppm moisture prior to chain-extension via reactive extrusion. Preferably the drying is carried out in situ in the same vacuum reactor in which the melt-phase and solid-phase polycondensing was carried out. The resulting material is then subject to chain extension by reaction in a mixing extruder to form the final polymer.

Chain-extension is carried out in any type of melt-extruder with sufficient mixing, temperature and residence time to melt, mix, and react the intermediate polymer with a preferred bis-oxazoline-based chain-extender. Since the ingredients are fed into the extruder as solid powders, the extruder temperature starts low (20-60° C.) and increases to 220-260° C. whereupon the chain-extension reaction proceeds rapidly. Reactive extrusion residence time is typically 30 to 150 seconds, depending on the temperature and required degree of chain-extension. After reactive extrusion chain-extension and pelletization, either by underwater die-face cut or strand cut pelletization, the $M_w$ of the resultant PGA polymer as measured by Size Exclusion (Gel Permeation) Chromatography (GPC) is between 100,000 and 200,000, more preferably between 120,000 and 180,000, or more preferably between 140,000 and 160,000.

An oxazoline chain extender (e.g., a di-functional BOX reactive coupling agent and/or a multi-functional BOX reactive coupling agent) is a molecule having one or more oxazoline groups. The term "BOX" generally refers to a bis-oxazoline compound having at least two oxazoline groups. The oxazoline group may be substituted at one or more carbon atoms with a substituent or linker unit that binds a further oxazoline group to thereby for a BOX compound. The oxazoline group is shown below.

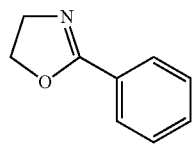

Oxazoline

Examples of oxazolines include compounds such as 2,2'-m-phenylene-bis(2-oxazoline), 2,2'-p-phenylene-bis (2-oxazoline), 2-phenyl-2-oxagoline, and styrene-isopropenyl-2-oxazoline; oxazine compounds, such as 2-methoxy-5,6-dihydro-4H-I, 3-oxazine; and oxazoline compounds having a chiral center such as 2,2'-bis[(4S)-4-benzyl-2-oxazoline], 2,2-bis((4S)-(−)-4-isopropyloxazoline)propane, (4S)-(+)-4-[4-(tert-butyl)phenyl]-α-[(4S)-4-[4-(tert-butyl) phenyl]-2-oxazolidinylidene]-2-oxazolineacetonitrile, (+)-2,2'-isopropylidenebis[(4R)-4-benzyl-2-oxazoline], 2,2'-isopropylidenebis[(4S)-4-tert-butyl-2-oxazoline], (−)-2,2'-isopropylidenebis[(4S)-4-phenyl-2-oxazoline], (+)-2,2'-isopropylidenebis[(4R)-4-phenyl-2-oxazoline], 2,2'-methylenebis[(4S)-4-tert-butyl-2-oxazoline], [3aR-[2 (3'aR*,8'aS*),3'aβ,8'aβ]]-(+)-2,2'-methylenebis[3a,8a-dihydro-8H-indeno[1,2-d]oxazole], (3aS,3'aS,8aR,8'aR)-2,2'-methylenebis[3a,8a-dihydro-8H-indeno[1,2-d]oxazole], 2,2'-methylenebis[(4R,5S)-4,5-diphenyl-2-oxazoline], 2,2'-methylenebis[(4S)-4-phenyl-2-oxazoline], (4S,4'S)-(−)-2,2'-(3-pentylidene)bis(4-isopropyloxazoline), (4S)-(+)-phenyl-α-[(4S)-phenyloxazolidin-2-ylidene]-2-oxazoline-2-acetonitrile.

In a preferred embodiment of the process, the polycondensing, crystallizing and solid-state polycondensing are carried out in a vacuum reactor to form the intermediate polymer. The vacuum reactor is capable of achieving and maintaining a pressure lower than an ambient pressure outside of the vacuum reactor. Preferably the vacuum reactor is able to carry out the steps of polycondensing, crystallizing and/or solid-state polycondensing at a pressure of 100-1,500 mbar, preferably 200-1,200, preferably 400-1,000, or 600-800 mbar. The pressure during any of the polycondensing, crystallizing or solid-state polycondensing steps may vary over time. Especially during the polycondensing of the liquid reaction mixture, the process may begin at ambient pressure and is gradually reduced to remove dissolved gases and atmosphere in the vacuum reactor. Preferably, after polycondensation of the liquid reaction mixture, vacuum is maintained to remove volatile byproducts of the reaction such as water, alcohol or low molecular weight volatile organic materials. The vacuum reactor is preferably maintained at a pressure lower than ambient pressure during the crystallizing and solid-state polycondensing, preferably there is no break in vacuum during beginning at the crystallizing and extending through the solid-state polycondensing thereby ensuring the dryness of the prepolymer material.

Figure 2:
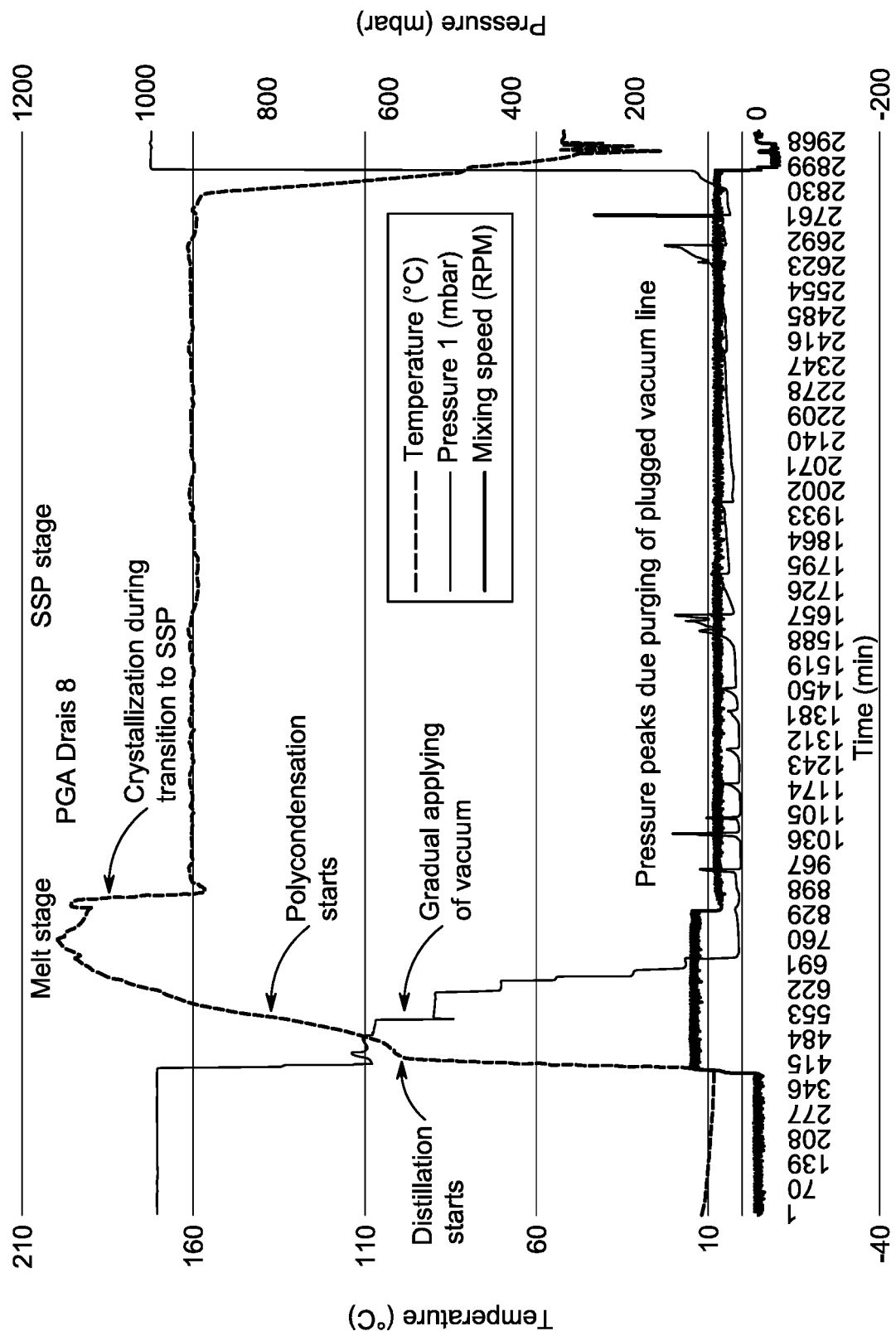
FIG. 2 shows time, temperature, and pressure changes in a process for making an intermediate hydroxy-acid polymer.

FIG. 2 describes the progression of pressure and temperature during a process of polycondensing, crystallizing and solid-state polycondensing PGA. At the initiation of the process the pressure inside the vacuum reactor is the same as ambient pressure. Pressure is gradually reduced as the temperature is increased. An increase in temperature in the presence of a catalyst such as a sulfonic acid material leads to the formation of a poly(hydroxy acid) prepolymer and the release of water. As the pressure is further lowered and the temperature increases, water and other byproducts formed during the polycondensing are removed from the vacuum reactor (e.g., the agitated polycondensation reactor). The polycondensing is continued until a desired temperature range (for example 160-210° C.) is attained and at which time the pressure is optionally reduced and maintained at a value of, for example, 200 mbar or less. The $M_w$ of the thus formed polycondensed material is preferably ≥10,000 by GPC, more preferably ≥12,000, ≥15,000, ≥18,000, or ≥20,000.

Crystallizing occurs by rapidly dropping the temperature of the vacuum reactor (which preferably is jacketed thereby permitting cooling with a heat transfer medium) and the polycondensed liquid reaction mixture therein. For example, the cooling rate may be 5° C./min. or greater, preferably 10° C./min. or greater, more preferably 20° C./min. or greater. Preferably the temperature is reduced from 190-220° C. then maintained at a temperature of 140° C. or greater for the remainder of the crystallizing and, preferably, for the solid-state polymerizing. A rapid decrease in temperature promotes quick solidification and crystallization of the polycondensed liquid reaction mixture. This in turn leads to fracturing and pulverization inside the agitated vacuum reactor.

The vacuum reactor is preferably a vacuum reactor that carries out agitation and de-volatilization of the reaction mixture in a single apparatus/chamber. The vacuum reactor apparatus preferably has a paddle-type configuration to promote mixing of the viscous polycondensed material and to impart sufficient force to the crystallized reaction mixture to permit its fracturing and pulverization to form a particulate material. Preferably agitation is continued throughout the polycondensing and crystallizing phases of the process. Pressure is maintained at a level sufficient to remove water and/or volatile organic materials formed during the polycondensing. The resultant crystallized reaction material preferably has a water content of less than 100 ppm, more preferably less than 75 ppm, 50 ppm or most preferably less than 25 ppm by weight based on the weight of the crystallized and pulverized material.

The vacuum reactor is preferably a cylindrical reactor arranged horizontally. A high speed homogenizer may be used together with the vacuum reactor to promote sufficient mixing of the pre-polymer material formed by the polycondensing and to form a particulate material having an average particle size that is preferably less than 10 mm, more preferably less than 5 mm, more preferably less than 3 mm. Preferably more than 90% by weight, more preferably 95% by weight or most preferably 98% by weight of the particulate crystallized material has a particle size of less than 10 mm, preferably less than 5 mm more preferably less than 3 mm.

The solid-state polycondensing of the crystallized and pulverized material is preferably carried out at a temperature of at least 140° C. and lower than the glass transition temperature of the poly(hydroxy acid) polymer to form the intermediate polymer. The solid state polycondensing is preferably carried out at a temperature of from 145-185° C., more preferably 155-175° C., and most preferably 160-170° C. The solid-state polycondensing is preferably carried out for hours, for example, from 2 to 96 hours, preferably 4-80 hours, more preferably 8-72 hours, or most preferably 12-60 hours. Preferably the solid-state polycondensing is carried out at a pressure of 400 mbar or less, more preferably 290 mbar or less, or most preferably 100 mbar or less. The resultant solid-state polycondensed material preferably has a weight average molecular weight of ≥20,000, preferably ≥25,000, more preferably ≥30,000, or most preferably ≥35,000. The amount of hydroxyl- and carboxyl-end group determination is preferably greater than 90% by mole, more preferably greater than 95% by mole, or most preferably greater than 98% by mole.

The solid-state polycondensed material is subsequently transferred to a melting and mixing reactor for combining with a BOX coupling agent and optional additives. The coupling agent serves to further condense/react, through the end groups, the solid reaction mixture formed by the solid-state polycondensing. This leads to an overall increase in the molecular weight and forms the final polymer. Combining the coupling agent and the solid material obtained from the solid-state polycondensing may be carried out concurrently or separately from the step of melting the solid-state polycondensed material. Most preferably, the solid-state polycondensed material is fed into a mixing extruder together with the BOX coupling agent. Alternately, the BOX coupling agent may be added as a separate feed into an extruder port downstream of the feed port such that the solid-state polycondensed material is molten in the reaction extruder prior to exposure to the coupling agent.

In another preferred embodiment of the invention a process for making a high molecular weight poly(hydroxy acid) polymer comprising at least 90% by weight of reacted units of one or more hydroxy acid monomers and having a weight average molecular weight of >100,000 by GPC, comprises (1) mixing one or more hydroxy acid monomers selected from the group consisting of glycolic acid and lactic acid, at least one of a diol initiator and a di-acid initiator, and at least one multifunctional initiator to form a liquid monomer mixture in an agitated polycondensation reactor, (2) polycondensing the liquid monomer mixture to form a liquid reaction mixture comprising a pre-polymer having a weight average molecular weight of >10,000 by GPC, and greater than 80% by mole carboxyl or hydroxyl end-group termination, (desired end-group termination for a given recipe is either carboxyl or hydroxyl, but not both for the same pre-/intermediate-polymer), (3) crystallizing the liquid reaction mixture in the agitated polycondensation reactor to form a first solid reaction mixture, (4) solid state polycondensing the solid reaction mixture to form a second solid reaction mixture having a moisture level less than 50 ppm by weight and comprising an intermediate-polymer having weight average molecular weight of >20,000 by GPC, and greater than 90% by mole hydroxyl or carboxyl end-group termination, (desired end-group termination for a given recipe is either carboxyl or hydroxyl, but not both for the same pre-/intermediate-polymer), (5) mixing the second solid reaction mixture with at least one of a di-functional BOX reactive coupling agent and a multi-functional BOX reactive coupling agent to form a coupling reaction mixture, and coupling the coupling reaction mixture in a melting and mixing extruder to form the final poly(hydroxy acid) polymer. In addition, it is preferable that the liquid monomer mixture remains in the agitated polycondensation reactor during polycondensing, the liquid reaction mixture remains in the agitated polycondensation reaction during ciystallizing, and the second solid reaction mixture remains in the agitated polycondensation reaction during the solid state polycondensing such that the pre-polymer, and the first solid reaction mixture and the intermediate-polymer are not removed from the agitated polycondensation reactor prior to performing the coupling reaction. It is also preferred that (1) the liquid reaction mixture is agitated in the agitated polycondensation reaction during the crystallizing to form particles of the solid reaction mixture, that (2) the average particle size of the particles of the solid reaction mixture is less than 3 mm, that (3) crystallizing includes cooling the liquid reaction mixture to a temperature of no greater than 185° C. (the cooling temperature is typically the temperature that is planned for solid-state condensation), that (4) the liquid monomer mixture is reacted at a temperature of greater than or equal to ≥190° C. to 220° C., that (5) the solid reaction mixture is solid state polycondensed at a temperature of from 140° C. to ≤185° C., that (6) the coupling reaction mixture is formed and coupled in the melting and mixing extruder, that (7) the liquid monomer mixture is polycondensed at a temperature of 190-220° C. and the solid reaction mixture is solid state polycondensed at a temperature of 150-180° C., that (8) crystallization includes cooling the liquid reaction mixture in the agitated polycondensation reactor at a rate of 10° C./min or greater, that (9) the solid pre-polymer temperature remains above 150° C. during the crystallizing and the solid state polycondensing, that (10) the pressure in the agitated polycondensation reactor remains below 500 mbar during the polycondensing and the crystallizing.

The poly(hydroxy acid) (e.g., PGA) may be used to make one or more layers of a container or film having improved gas barrier properties, preferably a container made with polyethylene terephthalate as a major resin or co-major resin. Nevertheless, the poly(hydroxy acid) polymer may be used with many other thermoplastics of the polyester type. Examples of such other materials include polyethylene 2.6- and 1,5-naphthalate (PEN), PETG, poly(tetramethylene 1,2-dioxybenzoate) and copolymers of ethylene terephthalate and ethylene isophthalate.

The poly(hydroxy acid) polymer may also be used with one or more recycled resins and/or may be recycled as mixture with a PET resin. "Recycled" refers to a broad category of materials that have been reprocessed. "Post-Consumer Recycled" (or PCR) refers to materials which have been recovered after commercial use. Recycled materials include post-consumer recycled materials in addition to materials that have been recovered at any other point during processing or use.

In an especially preferred embodiment, a "high IPA PET is used as a polyester based material or major resin which is coated with a poly(hydroxy acid) polymer. As it is used herein, the term "high-IPA PET refers to PET to which IPA was added during to manufacture to form a copolymer in which the IPA content is more than about 2% by weight, preferably 2-10% IPA by weight, more preferably 3-8%, most preferably about 4-5% IPA by weight. As used herein, "PET includes "high IPA PET." High-IPA PET (more than about 2% by weight) may be preferred because improved interlayer adhesion is obtained.

In other embodiments the poly(hydroxy acid) polymer is used as a component of a barrier material that may be blended with recycled or virgin resin (e.g., PET) to provide barrier properties. Preferred barrier materials include Copolyester Barrier Materials and Phenoxy-type Thermoplastics. Other preferred barrier materials include polyamide barrier materials such as Nylon MXD-6 from Mitsubishi Gas Chemical (Japan), "Polyamide Blends" including those polyamides containing PET or other polyesters, whether such polyester was included by blending, compounding or reacting. Other barrier materials having similar properties may be used in lieu of these barrier materials. For example, the barrier material may take the form of other thermoplastic polymers, such as acrylic resins including poly(acrylonitrile) polymers, acrylonitrile styrene copolymers, polyamides, polyethylene naphthalate (PEN), PEN copolymers, and PET/PEN blends.

Asymmetric (anisotropic) membranes contain a number of layers, each with different structures, permeability's and gas barrier properties. A typical anisotropic membrane has a surface layer (i.e. the "skin") supported on a much thicker substructure. The gas barrier properties and permeation rates are determined primarily by the surface layer; and the substructure functions as mechanical support. The graded nature of asymmetric membranes results in a sidedness to the membrane, requiring knowledge of the upstream side of the membrane for optimal performance. The present invention includes membranes both with and without this so-called sidedness. Symmetric membranes and/or layers do not have this sidedness.

"Polymers" useful in preparing the membranes or layers (and associated formed articles such as bottles) of the invention include, but are not limited to, aromatic polyamides, aliphatic polyamides, cellulose acetates, cellulose nitrate, cellulosic derivatives, ethyl cellulose, polyesters, polycarbonates, copolycarbonate esters, polyethers, polyetherketones, polyetherimides, polyethersulfones, polyetheresters, polysulfones, polyvinylidene fluoride, polybenzimidazoles, polybenzoxazoles, polyacrylonitrile, polyazoaroaromatics, poly(2,6-dimethylphenylene oxide), polyphenylene oxides, polyureas, polyurethanes, polyhydrazides, polyazomethines, polyacetals, styrene-acrylonitrile copolymers, brominated poly(xylene oxide), sulfonated poly(xylylene oxide), polyquinoxaline, polyamide imides, polyamide esters, polysiloxanes, polyacetylenes such as poly(trimethylsilylpropyne), polyphosphazenes, polyolefines such as polyethylene, polypropylene and poly(4-methylpentene), polyphenylenes, polyimides, polyesters and so called ladder polymers, polyacrlonitrile, polyphthalamides, polysulfonamides, polyamide-imides, phenylene diamines such as ortho-phenylenediamine and meta-phenylenediamine, Matrimid®, Leming P84, polyamide hydrazide, Nylon 6, poly(ethylene-eo-vinyl alcohol), polytetrafluoroethylene, and the like and any blends, copolymers, and substituted polymers thereof. Polymers preferred for preparing the membranes of the invention include industrially-practicable polymers such as cellulose acetates.

The thickness of the base support may be between about 75 and about 500 microns thick, although other thicknesses may be used such as 100-400 microns or 200-300 microns. The polymeric porous base support may be reinforced by backing with a fabric or a non-woven web material. Non-limiting examples include films, sheets, and nets such as a nonwoven polyester cloth. The polymer of the porous base support may permeate through the pores, be attached on both sides of the support, or be attached substantially on one side of the support.

A layer containing the poly(hydroxy acid) polymer may comprise a single material, a mix or blend of materials (heterogeneous or homogeneous), an interwoven matrix of two or more materials, or a plurality of microlayers (lamellae) comprised of at least two different materials.

In another preferred embodiment, a container is produced having a polymer composition comprising a polyethylene terephthalate (PET) polymer or copolymer, and the poly (hydroxy acid) polymer or copolymer of this invention wherein the PET has an intrinsic viscosity between about 0.65 and about 1.30 d/g, and wherein the container is selected from the group consisting of an injection molded container, a stretch blow molded container, an extrusion blow molded container, and a thermoformed container. It is also preferred that in this container, the poly(hydroxy acid) polymer component of this invention is confined to one or more discrete or semi-discrete layers which have an overall multi-layer container structure and that the container is fully compatible with the existing PET recycling streams as defined by the Association of Plastics Recyclers (APR) Critical Guidance.

The presence of additives and catalysts during the process of making the thermoplastic polymer may lead to the formation of a product in which residues of additives present during the polycondensing, solid-state polymerizing and/or extrusion reaction remain in the thermoplastic polymer. These additives may include, for example, catalysts, catalyst deactivators, heavy metal deactivators, heat stabilizers and/or antioxidants. Heat stabilizers and antioxidants, when present, are in amounts of 10 ppm-1%, preferably 100 ppm-0.1%0, 50-250 ppm or about 500 ppm based on the total weight of the thermoplastic polymer. Residues from catalyst deactivators and heavy-metal deactivators, when present, are typically in lower amounts, e.g., 10-100 ppm, preferably 25-75 ppm or about 50 ppm by weight.

Catalyst deactivators include compounds that have a polar group or functionality containing an oxygen, nitrogen, phosphorus and/or sulfur atom, particularly compounds that are acidic (e.g., protic) such as amines, alkali or alkaline earth metal salts of carboxylic acid, water, hydrotalcites. Examples include phosphoric acid, monochloroacetic acid, dodecylbenzenesulfonic acid, p-toluenesulfonic acid, benzoyl chloride, etc. Other deactivators include thioether compounds, vitamin compounds, triazole compounds, polyamine compounds, compounds of hydrazine derivatives, and phosphorous compounds, such as phosphate compounds, phosphite compounds, or metal phosphate inorganic compounds. Specific examples of the catalyst deactivator include phosphite compounds such as "ADK STAB" AX-71 (dioctadecyl phosphate), PEP-8 (distearylpentaerythritol diphosphite), and PEP-36 (cyclic neopentatetraylbis(2,6-t-butyl-4-methylphenyl)phosphite)) available from ADEKA CORPORATION, and metal phosphate inorganic compounds selected from sodium dihydrogen phosphate, potassium dihydrogen phosphate, lithium dihydrogen phosphate, calcium dihydrogen phosphate, disodium hydrogen phosphate, dipotassium hydrogen phosphate, calcium hydrogen phosphate, sodium hydrogen phosphite, potassium hypophosphite, calcium hydrogen phosphite, sodium hypophosphite, potassium hypophosphite, and calcium hypophosphite.

Thermal stabilizer additives include organophosphites (e.g. triphenyl phosphite, tris-(2,6-dimethylphenyl)phosphite, tris-(mixed mono- and di-nonylphenyl)phosphite or the like), phosphonates (e.g., dimethylbenzene phosphonate or the like), phosphates (e.g., trimethyl phosphate, or the like), tris(2,4-di-t-butylphenyl) phosphate available as IRGAPHOS 168 or combinations.

Antioxidant additives include organophosphites such as tris(nonyl phenyl)phosphite, tris(2,4-di-tert-butylphenyl) phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants.

A further preferred embodiment is a polymer film or film-derived package having a polymer composition comprising a thermoplastic polymer or copolymer and the (poly) hydroxy acid polymer or copolymer of this invention where the poly(hydroxy acid) polymer component is confined to one or more discrete or semi-discrete layers which comprise an overall multi-layer film structure, and is also fully compatible with one or more of the existing recycling streams as defined by the Association of Plastics Recyclers (APR) Critical Guidance.

Commonly used rigid packages are containers for carbonated and non-carbonated beverages and food as well as non-food liquids, such as shampoos and household detergents. These containers can be made by a two-step process. In the first step a preform is produced by injection molding, and in the next step the preform is reheated and biaxially stretched and blown to give final container shape, size, and integrity with desirable thermo-mechanical properties.

Embodiments of the invention include processes of forming a container using a thermoplastic polymer according go the present disclosure. Preferably as a pre-conditioning step prior to the injection molding process, the thermoplastic and polyester resin(s) of similar species or physical mixtures are dried and fed to an injection molding machine from a drying hopper. They are then conveyed and melted by extrusion screw and injected under pressure into a mold. The mold may have one or more preform cavities to make a one or several preforms in a single cycle. The molded preform may have a single- or multi-layer structure type.

In a multi-layer application, the thermoplastic polymer and one or more different resins may be fed independent of each other to create a multilayered preform structure. For example, a three layer bottle may have an AB or ABA structure, where a middle layer of resin B is sandwiched between two structural layers of resin A on either side. The B layer, preferably the layer comprising the thermoplastic polymer, is often a thin section of the wall, generally about 5-15% of the total preform wall thickness. The multi-layer bottles allow for a specialized resin such as the thermoplastic polymer of the present disclosure to be isolated in a specific location within the container. The final structure is preferably ABA, the co-injection injection molding sequence may be A, B; A,B,A; or ABA, A: where A is injected first, while A is being injected, B is introduced, then B is stopped and A continues until the final preform is packed out.

The timing sequence and mold temperatures can be adjusted to position the B layer (e.g., the layer containing the thermoplastic polymer) in the center of the preform or preferentially to the inside or outside of the preform wall. The sequence can also be managed to position the specialize B layer so that it only falls within the amorphous regions of the preforms that will eventually reheated and stretch blow molded. The advantage of this is to minimize or eliminate the thermoplastic polymer from being in the thicker amorphous regions of the thread finish and base pushup regions that do not get stretched during a subsequent blowing process. This also allows for the total encapsulation of the thermoplastic polymer. Another option is to create a 5 layer structure ABABA via a sequential injection molding sequence A-B-A. In this case, A is injected first, and then stopped, B is injected next and then stopped, and then A is injected last packing out the preform. This creates two thin B layers due to the 'Fountain Flow" filling of injection molding cavities.

Conventionally, a resin preform is transformed to a bottle or a container by blow-molding. Blow molding, also known as blow forming, is a manufacturing process by which hollow plastic parts are formed. It is a process used to produce hollow objects from thermoplastic. In general, there are three main types of blow molding: extrusion blow molding, injection blow molding, and stretch blow molding. The blow molding process begins with melting down the plastic and forming it into a parison or preform. The parison is a tube-like piece of plastic with a hole in one end in which compressed air can pass through.

The basic process has two fundamental phases. First, a preform (or parison) of hot plastic resin, often in a somewhat tubular shape, is created. Second, a pressurized gas, usually air, is used to expand the hot preform and press it against a mold cavity. The pressure is held until the plastic cools. This action identifies another common feature of blow molded articles. Part dimensional detail is better controlled on the outside than on the inside, where material wall thickness can alter the internal shape. Once the plastic has cooled and hardened the mold opens up and the part is ejected.

In the blow molding step, preforms are loaded on a conveyor and preferably passed in front of infrared (IR) heating lamps to heat the preform typically 10-20° C. above the polymer glass transition temperature ($T_g$) prior to one or more the stretching and/or blowing steps. The preform is thicker and shorter than the final container wall to account for the self-leveling of the polymer and the resulting axial and hoop stretch ratios (blow up ratio BUR) of the final container shape. To reheat the preform uniformly, typically, a low concentration of IR absorbing species, called reheat or fast heat up additive, are added to one or more layers, preferably PET layers, to improve the absorption of IR-radiation by the polyester preform and subsequently conduct heat into the surrounding preform wall section.

The thermoplastic polymer of the present disclosure can be processed by any method of processing a resin, e.g., by melting the polymer, forming a shaped article from the molten polymer, and cooling the shaped article to form a solid shaped article. Processing includes any method by which the thermoplastic polymer is transformed from a solid form to a flowable and/or plastic form. The transforming may include heating the thermoplastic polymer beyond the glass transition temperature then forming a shaped solid article from the heated thermoplastic polymer. Processing further includes any method by which a solid thermoplastic polymer and/or co-resin such as a PET resin is heated above its glass transition temperature and/or melt temperature and is subsequently and/or concurrently formed into a shaped article, including: injection molding, reaction injection molding (RIM), stretch blow molding, injection blow molding, recycling, extrusion molding (including EBM), compression molding, thermoforming, and such methods for processing polyester resins as described in "PET Packaging Technology," by David W. Brooks and Geoff Giles (2002), the portions of which describe processing methods for polyester resins and/or PET resins are incorporated herein by reference. Preferred processing for forming a container or film includes injection (blow) molding, sheet and film extrusion, profile extrusion, extrusion blow molding (EBM) and compression molding; most preferably EBM.

The IV of the polyester resin that may be used in the method of the invention to form one or more layers separate from or in combination with the thermoplastic polymer may fall within a wide range. For example, the IV of the polyester resin may be from 0.6 to 1.0 dL/g, preferably from 0.65 to 0.9, more preferably from 0.7 to 0.85, even more preferably from 0.72 to 0.80, especially preferably about 0.76.

The extrusion blow molding (EBM) process is the most common process for producing containers such as plastic bottles, particularly large plastic bottles. The basic extrusion blow molding process comprises plasticizing or melting the thermoplastic polymer and/or a resin in an extruder, forming a parison by extrusion of the molten resin through a die into a mold, blowing the parison to fit the shape of the bottle mold and cooling, then deflashing of the blown bottle and ejection of the finished product. Variations can include multiple extruders for coextrusion of two or more materials for multilayer bottle structures, parison programmer to shape the parison to match complex blown product shapes and wall thickness, and multiple mold clamp systems to improve output through the use of multiple molds.

In the EBM process, an extruder melts, mixes, and feeds a homogeneous molten polymer into a die head that forms the molten hollow plastic tube, called a parison, used in blowing hollow containers or other hollow products. The first step is extrusion of a hollow plastic parison which is usually in a downward direction for making bottles. Next, the two halves of the mold close on the parison, capturing it as it is cut off from the extruder by a cold or heated cut-off knife. A blow pin or a needle is inserted and air is blown into the mold, expanding the parison. In some cases the blown pin cooled by water, assists in forming the thread finish by compressing the thread finish section into the mold (neck calibration), rather than simply blowing it in. This results in a smooth interior in the finish region. In the needle blow case, the needle is inserted into a part of the molded object that is trimmed off forming the final container shape, and the inside of the finish is formed only by air. The mold is cooled, usually with water, to solidify the plastic. When the container is cool enough to maintain its shape, it is ejected from the mold.

The extrusion of the thermoplastic polymer to form the multi-layer EBM parison may be carried out under different conditions. Preferably, extrusion is carried out with an EBM apparatus that is capable of completely melting the thermoplastic polymer and any corresponding polyester co-resin and having sufficient injection pressure to rapidly extrude the molten resin through a shaped die into the desired parison shape. The extruder portion of such a molding apparatus may contain a plurality of heating zones. The temperature of each heating zone is independently controlled. The number of heating zones is not limited, preferably, the number of heating zones is 4 or more, more preferably 5 or more, more preferably 6 or more, more preferably 7 or more, more preferably 8 or more, even more preferably 9 or more, most preferably 10 or more. Each heating zone is capable of heating the polyester resin to a temperature above the melting temperature of the polyester resin. The temperature of any zone may vary from, for example, 400 to 600° F., preferably from 450 to 550° F., more preferably from 475 to 525° F., most preferably about 500° F. Any of the aforementioned temperatures may be varied by any increment of, for example, 2, 4, 6, 8 or 10° F., or any multiple thereof.

The screw speed of an EBM apparatus used to carry out the molding may be varied as needed to adjust cycle time and other factors of the extrusion process. For example, the screw speed may be from 5 to 100 rpm, preferably from 10 to 80 rpm, more preferably from 20 to 60 rpm, more preferably from 30 to 50 rpm, more preferably about 40 rpm. The screw speed may be varied in any increment of 1, 2, 4, 6, 8 and 10 rpm within any of the aforementioned ranges, or any multiple thereof.

The head pressure of the extrusion process may be varied and may range from 0 to 1800 psig, preferably from 300 to 1500 psi, more preferably from 800 to 1200 psi. The cycle time is preferably less than 30 seconds, more preferably less than 20 seconds, and most preferably less than 10 seconds. The cycle time is the total time from clamp open to clamp open. The cycle time is usually defined by the following functions; mold close, blow air injection, hot-knife cut, mold shuttle, part cooling, mold open, part ejection, mold return, mold close. Simultaneously and within the same amount of time, resin is being melted into a liquefied state, the resin is undergoing conditioning (e.g. extrusion), and the molten resin (e.g., polymer melt) is continuously forming another parison in preparation for transfer into the mold space. One method includes feeding the resin into an extruder for melting and mixing within a heated extruder with a revolving screw that compresses and conditions the polymer as it changes phase from a solid to a liquid, the liquefied resin is then continuously extruded into a hollow parison which is subsequently captured into a mold. Since these actions may dependently coincide, a correlation can be drawn between the time of the cycle, and the time that the polymer is in the liquid phase. This correlation may differ from bottle parison to bottle parison and from mold to mold and from machine to machine.

The flash is trimmed from the container neck and bottom, as well as from other areas that are pinched off, for instance to form handles or offset necks. The mark left from the removal of the flash serve as an easy means for identification of extrusion blow-molded containers. Usually, this is easiest to see on the bottom of the container. It typically appears as a rough area along the mold parting line, centered in the middle of the bottom and running half or so of the distance to the heel of the bottle. It is also possible, on careful examination, to identify the roughness at the top of the finish, or on other areas where flash was trimmed.

During molding the bottle from the hot, molten/softened parison following capture into the mold, the parison is expanded under pressure by a gas to fill the outer dimensions of the mold. During this blowing process the thermoplastic polymer and/or polyester resin may undergo significant stretching. Typically in EBM there is little or no axial stretch since the extruded parison is longer than the length of the mold in order to insure top and bottom capture into the mold. The hoop stretch ratio of the EBM container may be, for example, from 3 to 7 times, preferably from 3.5 to 6.5 times, more preferably from 4 to 6 times, most preferably from about 4.5 to about 5.5 times, even more preferably about 5 times.

The bottle parison may then be blown into a straight wall mold or into shaped and/textured molds and of all sizes may be used without restriction. One handleware bottle form is a two-liter or larger laundry detergent bottle. Another form is a one-gallon juice bottle.

EXAMPLES $^{13}$C NMR spectra were acquired at 22° C. on a 600 MHz Bruker Avance III NMR spectrometer equipped with a QCI (H-P/C/N-D) cryoprobe. An inverse gated pulse sequence with 30 degrees flip angle was used and 4096 scans with 16 dummy scans were collected. The acquisition time was 0.9 s and the relaxation delay was 3 s. Samples were dissolved in a 2:1 v/v mixture of 1,1,3,3,3-hexafluoro-2-propanol (99.9%, Fluorochem) and deuterated chloroform (99.8%, VWR). Chromium (III) acetylacetonate (97%, Aldrich) was added as a relaxation agent. The quantitative $^{13}$C NMR spectra were used for the end group analysis and the calculation of average number molecular weights (Ma) according to a protocol developed earlier at VTT Molecular weight and molecular weight distributions of PGA polymers were determined by Size Exclusion (Gel Permeation) Chromatography at 40° C. The measurement system was equipped with Waters Styragel columns and Waters 2410 refractive index detector. The eluent used was Fluorochem 1,1,3,3,3-hexafluoro-2-propanol (99.9%) with Sigma-Aldrich 5 mM sodium trifluoroacetate (98%) delivered at a rate of 0.5 mL/minute. The results were calibrated against poly(methyl methacrylate) standards from Agilent Technologies.

Differential scanning calorimetry (DSC) measurements were performed on DSC2 equipment (Mettler Toledo GmbH, Switzerland). Samples were heated from 0 to 240° C. at the dynamic heating rate of 10° C./min. The program consisted of the following segments: 1) dynamic phase from 0° C. to 110° C.; 2) isothermal phase at 110° C., 60 min.; 3) dynamic phase from 110° C. to 240° C. (first heating); 4) isothermal phase at 240° C., 10 min.; 5) dynamic phase from 240° C. to 0° C. (first cooling); 6) isothermal phase at 0° C., 2 minutes; 7) dynamic phase from 0° C. to 240° C. (second heating), 8) isothermal phase at 240° C., 2 minutes; and 9) dynamic phase from 240° C. to 20° C. (second cooling). Glass transition temperatures ($T_g$) were determined from the second heating scan. The melting temperature ($T_m$) and crystallization temperature ($T_c$) were evaluated from both heating and cooling steps.

By utilizing this process, recipe, and their preferred embodiments, as described herein, PGA pre-polymer, intermediate polymer and final polymer suitable for co-injection molding or co-extrusion blow molding with PET may be produced.

Tables 1 and 2 describe two series of pre-polymers formed by polycondensing glycolic acid in two different type reactors. Table 3 describes the results of chain extension in which a solid reaction mixture that contains a BOX coupling agent and a poly(hydroxy acid) prepolymer is subject to extrusion and mixing in a twin screw extruder and the properties of the corresponding poly(glycolic acid) polymers. Irganox B215 and BASF PEP-36 are examples of commercially available thermo-oxidative stabilizers that were evaluated.

TABLE 1

Characterization of carboxylic chain-end terminated PGA intermediate prepolymers prepared from technical grade glycolic acid in a Drais type reactor.

| Sample Code | Catalyst (wt %) | Stabilizer (wt %) | Glycolic Acid (wt %) | Adipic Acid (wt %) | Trimellitic Anhydride (wt %) | Methoxyacetic Acid (wt %) | Melt Temp (° C.) | Melt Time (hrs) | SSP Temp (° C.) |
|---|---|---|---|---|---|---|---|---|---|
| PGA Drais 4.2 | 0.05 | 0.1 | 97.65 | 1.90 | 0.00 | 0.3 | 200 | 7 | 175 |
| PGA Drais 5.2 | 0.03 | 0.1 | 97.37 | 0.95 | 1.25 | 0.3 | 200 | 7 | 170 |
| PGA Drais 6.2 | 0.03 | 0.1 | 97.42 | 1.90 | 0.25 | 0.3 | 200 | 7 | 160 |
| PGA Drais 7.2 | 0.03 | 0.1 | 98.25 | 0.95 | 0.375 | 0.3 | 200 | 7 | 160 |
| PGA Drais 8.2 | 0.03 | 0.2 | 97.38 | 1.90 | 0.1875 | 0.3 | 200 | 7 | 160 |
| PGA Drais 9.2 | 0.03 | 0.2 | 98.25 | 1.425 | 0 | 0.1 | 200 | 7 | 160 |
| PGA Drais 12.2 | 0.03 | 0.2 | 97.20 | 1.90 | 0.375 | 0.3 | 200 | 7 | 150 |
| PGA Drais 13.2 | 0.01 | 0.2 | 97.22 | 1.90 | 0.375 | 0.3 | 200 | 7 | 160 |
| PGA Drais 14.2 | 0.02 | 0.2 | 97.21 | 1.90 | 0.375 | 0.3 | 200 | 7 | 160 |
| PGA Drais 15.2 | 0.02 | 0.2 | 97.46 | 1.52 | 0.50 | 0.3 | 200 | 7 | 158 |
| PGA Drais 16.2 | 0.025 | 0.2 | 97.46 | 1.52 | 0.50 | 0.3 | 200 | 7 | 159 |
| PGA Drais 17.2 | 0.03 | 0.2 | 96.69 | 2.28 | 0.50 | 0.3 | 200 | 7 | 159 |
| PGA Drais 18.2 | 0.03 | 0.2 | 96.95 | 1.90 | 0.625 | 0.3 | 200 | 7 | 159.5 |
| PGA Drais 19.2 | 0.06 | 0.4 | 96.72 | 1.90 | 0.625 | 0.3 | 200 | 7 | 159.5 |

TABLE 1-continued

Characterization of carboxylic chain-end terminated PGA intermediate prepolymers prepared from technical grade glycolic acid in a Drais type reactor.

| Sample Code | SSP Time (hrs) | COOH—COOH (%) | NMR $M_n$ (g/mole) | GPC (g/mole) | | | |
|---|---|---|---|---|---|---|---|
| | | | | $M_n$ | $M_w$ | $M_p$ | PDI |
| PGA Drais 4.2 | 48 | 86 | 3,050 | 10,910 | 23,820 | 24,630 | 2.18 |
| PGA Drais 5.2 | 48 | 73 | 3,760 | 13,560 | 24,640 | 26,230 | 1.8 |
| PGA Drais 6.2 | 40 | 93 | 2,980 | 11,910 | 25,650 | 28,540 | 2.15 |
| PGA Drais 7.2 | 48 | 76 | 4,380 | 20,680 | 34,610 | 33,210 | 1.67 |
| PGA Drais 8.2 | 44 | 97 | 3,300 | — | 24,850 | — | — |
| PGA Drais 9.2 | 44 | 92 | 3,850 | — | 27,120 | — | — |
| PGA Drais 12.2 | 72 | 96 | 3,000 | — | 29,310 | — | — |
| PGA Drais 13.2 | 48 | 92 | 2,930 | — | 25,730 | — | — |
| PGA Drais 14.2 | 48 | 93 | 3,100 | — | 29,765 | — | — |
| PGA Drais 15.2 | 68 | 88 | 3,800 | — | 36,060 | — | — |
| PGA Drais 16.2 | 55 | 92 | 3,240 | — | 27,800 | — | — |
| PGA Drais 17.2 | 51 | 91 | 2,530 | — | 20,165 | — | — |
| PGA Drais 18.2 | 53 | 94 | 2,900 | — | 25,430 | — | — |
| PGA Drais 19.2 | 53 | 97 | 3,170 | — | 22,315 | — | — |

The examples presented in Table 1 demonstrate a portion of the wide variety of compositions and polycondensation process conditions which were considered and attempted in a Drais type reactor for preparing the poly(hydroxy acid) intermediate prepolymer of the present disclosure. Some attributes of these examples led to the preferred embodiments noted in the description and claims of the present disclosure. These results also led to additional series of experiments that were carried out in a larger Lodige type reactor.

TABLE 2

Characterization of carboxylic chain-end terminated PGA intermediate prepolymers prepared from technical grade glycolic acid in a Lodige type reactor.

| Sample Code | Catalyst (wt %) | Stabilizer (wt %) | Glycolic Acid (wt %) | Adipic Acid (wt %) | Trimellitic Anhydride (wt %) | Methoxyacetic Acid (wt %) | Melt Temp (° C.) | Melt Time (hrs) | SSP Temp (° C.) |
|---|---|---|---|---|---|---|---|---|---|
| PGA Lodige 1.2 | 0.06 | 0.4 | 96.7 | 1.90 | 0.625 | 0.3 | 200 | 7 | 160 |
| PGA Lodige 2.2 | 0.06 | 0.4 | 96.7 | 1.90 | 0.625 | 0.3 | 200 | 7 | 160 |
| PGA Lodige 3.2 | 0.06 | 0.1 | 97.0 | 1.90 | 0.625 | 0.3 | 200 | 7 | 160 |
| PGA Lodige 4.2 | 0.06 | 0.1 | 97.0 | 1.90 | 0.625 | 0.3 | 200 | 7 | No SSP |
| PGA Lodige 5.2 | 0.06 | 0.1 | 97.0 | 1.90 | 0.625 | 0.3 | 200 | 7 | 160 |
| PGA Lodige 6.2 | 0.06 | 0.6 | 97.0 | 1.425 | 0.625 | 0.3 | 200 | 7 | 165 |
| PGA Lodige 7.2 | 0.06 | 0.7 | 97.1 | 1.33 | 0.50 | 0.3 | 200 | 7 | 165 |

| Sample Code | SSP Time (hrs) | COOH—COOH (%) | NMR $M_n$ (g/mole) | GPC (g/mole) | | | |
|---|---|---|---|---|---|---|---|
| | | | | $M_n$ | $M_w$ | $M_p$ | PDI |
| PGA Lodige 1.2 | 53 | 94 | 3,010 | — | 24,380 | — | — |
| PGA Lodige 2.2 | 53 | 96 | 3,160 | — | 27,060 | — | — |
| PGA Lodige 3.2 | 53 | 97 | 3,140 | — | 21,720 | — | — |
| PGA Lodige 4.2 | No SSP | 80 | 2,170 | — | 17,150 | — | — |
| PGA Lodige 5.2 | 53 | 95 | 2,980 | — | 19,770 | — | — |
| PGA Lodige 6.2 | 53 | 95 | 4,000 | 8,320 | 26,150 | 29,870 | 3.14 |
| PGA Lodige 7.2 | 68 | 95 | 4,280 | 14,386 | 30,614 | 31,890 | 2.13 |

Similarly, the examples presented in Table 2 demonstrate the breadth and variety of compositions and polycondensation process conditions that were considered and attempted in a larger Lodige type reactor for preparing the poly (hydroxy acid) intermediate prepolymer of the present disclosure. Some attributes of these examples led to the preferred embodiments noted in the description and claims of the present invention. These preferred samples were used to develop the preferred embodiments of the reactive extrusion process as well as the preferred embodiments and compositional claims of the final poly(hydroxy acid) polymer which is one of the overall objective of this disclosure.

TABLE 3

Chain extension experiments performed with a twin-screw extruder (TSE) and molar masses and molar mass distribution of TSE chain-extended PGA polymers with their corresponding intermediate prepolymers.

| Sample Code | Intermediate Prepolymer | BOX (wt %) | Stabilizer (wt %) | TSE Speed RPM | TSE Torque (%) | Melt Temp (° C.) | Die Pressure (Bar) | GPC (g/mole) | | | |
|---|---|---|---|---|---|---|---|---|---|---|---|
| | | | | | | | | $M_n$ | $M_w$ | $M_p$ | PDI |
| TSE-618 | PGA Drais 6.2 | 5.00 | 0.40 | 240 | N/A | N/A | N/A | 29,560 | 84,150 | 67,270 | 2.85 |
| TSE-749 | PGA-Drais 4.2 | 3.00 | 0.20 | 180 | N/A | N/A | N/A | 33,780 | 95,950 | 75,770 | 2.84 |
| TSE-765 | PGA-Drais 4.2 + PGA-Drais 7.2 | 3.25 | 0.20 | 180 | N/A | N/A | N/A | 27,870 | 89,880 | 71,050 | 3.22 |
| TSE-71 | PGA-Drais 4.2 + PGA-Drais 5.2 | 5.00 | 0.30 | 150 | N/A | N/A | N/A | 29,740 | 102,840 | 69,500 | 3.45 |
| TSE-L646-0-0-0 (Sample A) | PGA-Lodige 6.2 | 4.60 | 0.80 | 180 | 77 | 245 | 63-64 | 25,890 | 120,420 | 67,430 | 4.65 |
| TSE-L646-0-0-0 (Sample B) | PGA-Lodige 6.2 | 4.60 | 0.80 | 180 | 77 | 245 | 63-64 | 26,320 | 113,470 | 65,380 | 4.31 |
| TSE-L6475-0-S (Bag 1) | PGA-Lodige 6.2 | 4.75 | 0.80 | 180 | 70-85 | 243 | 65-80 | 29,110 | 148,730 | 69,020 | 5.11 |
| TSE-L6475-0-S (Bag 4) | PGA-Lodige 6.2 | 4.75 | 0.80 | 180 | 70-80 | 243 | 100-150 | 32,230 | 154,860 | 71,210 | 4.80 |
| TSE-L6475-AX-S (Bag 2) | PGA-Lodige 6.2 | 4.75 | 1.00 | 180 | 65-85 | 243 | 90-115 | 24,690 | 134,960 | 63,890 | 5.47 |
| TSE-L649-0-0-S | PGA-Lodige 6.2 | 4.90 | 0.80 | 180 | 76 | 244 | 100-120 | 23,210 | 126,680 | 61,970 | 5.46 |
| TSE-L7395-0-S-B | PGA-Lodige 7.2 | 3.95 | 0.70 | 190 | 68-80 | 242 | 105-125 | 27,560 | 130,230 | 70,110 | 4.73 |
| TSE-L7395-AX-S (Bag 2) | PGA-Lodige 7.2 | 3.95 | 1.10 | 190 | 63-67 | 242 | 100-150 | 24,690 | 134,960 | 63,890 | 5.47 |
| TSE-L740-AX-S-B | PGA-Lodige 7.2 | 4.00 | 0.90 | 190 | 66 | 243 | 95 | 28,950 | 141,240 | 65,380 | 4.88 |
| TSE-L740-AX-S (Bag 1) | PGA-Lodige 7.2 | 4.00 | 1.10 | 190 | 67 | 243 | 110-140 | 28,310 | 131,710 | 62,450 | 4.65 |
| TSE-L740-AX-S (Bag 3) | PGA-Lodige 7.2 | 4.00 | 1.10 | 190 | 65 | 243 | 110-130 | 24,580 | 118,730 | 61,040 | 4.83 |
| TSE-L740-0-0-S | PGA-Lodige 7.2 | 4.00 | 0.90 | 180 | 80-90 | 245 | 95-110 | 27,380 | 138,980 | 69,560 | 5.08 |

The examples presented in Table 3 demonstrate the variety of recipes and reactive extrusion process conditions that are included in the present disclosure and were considered and attempted during development of the preferred embodiments of the present poly(hydroxy acid) final polymer. In particular, examples using the Lodige 7.2 intermediate prepolymer with lower Brancher and BOX levels compared favorable to examples using the Lodige 6.2 intermediate prepolymer with higher Brancher and BOX levels, specifically with respect to the final polymer viscosity stability over extended time in the melt phase.

TABLE 4

Comparative examples of linear and branched PGA polymers with different amounts of a chain-terminating ingredient.

| Sample Code | Intermediate Prepolymer | Adipic Acid (wt %) | Stabilizer (wt %) | Methoxyacetic Acid (wt %) | Trimellitic Anhydride (wt %) | BOX (wt %) | Die Pressure (Bar) | TSE Speed RPM |
|---|---|---|---|---|---|---|---|---|
| TSE-9036(a) | PGA Drais 9.2 | 1.425 | 0.40 | 0.1 | 0 | 3.60 | N/A | 240 |
| TSE-9036(b) | PGA Drais 9.2 | 1.425 | 0.40 | 0.1 | 0 | 3.60 | N/A | 240 |
| TSE-6045 | PGA Drais 6.2 | 1.90 | 0.30 | 0.3 | 0.25 | 4.50 | N/A | 270 |
| TSE-7395-AX-S | PGA Lodige 7.2 | 1.33 | 1.10 | 0.3 | 0.50 | 3.95 | 100-150 | 190 |

| Sample Code | TSE Torque (%) | Melt Temp (° C.) | GPC (g/mole) | | | |
|---|---|---|---|---|---|---|
| | | | $M_n$ | $M_w$ | $M_p$ | PDI |
| TSE-9036(a) | N/A | 233-250 | 21-25,000 | 68-77,000 | — | 2.85-3.43 |
| TSE-9036(b) | N/A | 233-250 | 21-25,000 | 68-77,000 | — | 2.85-3.43 |

TABLE 4-continued

Comparative examples of linear and branched PGA polymers
with different amounts of a chain-terminating ingredient.

| | | | | | | |
|---|---|---|---|---|---|---|
| TSE-6045 | N/A | 229-239 | 21-27,000 | 64-94,000 | — | 3.05-3.72 |
| TSE-7395-AX-S | 63-67 | 242 | 24,690 | 134,960 | 63,890 | 5.47 |

Table 4 presents comparative examples of linear versus branched poly(hydroxy acid) final polymers with differing levels of (1) brancher, as trimellitic anhydride, and (2) chain terminator, as methoxyacetic acid. These examples demonstrate the preferred embodiment of the present disclosure wherein the branched polymer has the ability during polycondensation to incorporate and render harmless (e.g., inactivate or scavenge the terminator function of the chain-terminating impurity present in the monomer feedstock) the undesired chain-terminator. A chain terminator that has been rendered harmless is no longer effective in inhibiting the polymer chain growth, intermediate and final molecular weight, and/or melt viscosity of the final poly(hydroxy acid) polymer.

polymer and good container performance (e.g. small CSD bottles, large EBM juice bottles, flexible film packaging for snack foods, etc.)

A key observation related to suitability for downstream processing is the "long-term" thermal stability of the final poly(hydroxy acid) polymer. In this context long-term stability is the stability of the melt viscosity (or representative force measurement) at temperature above the poly(hydroxy acid) polymer melt point for times ranging from more than 1 minute up to 20-30 minutes. Excessive levels of branched initiator, such as TMA, and/or chain-extender, such as BOX, can have a negative effect on the final polymer viscosity and hence, on its ability to be successfully processed into desirable articles for packaging.

TABLE 5

Comparative examples of the capillary melt viscosity
for linear and branched PGA polymers.

| Sample Code: | TSE-9036(a) | TSE-9036(b) | TSE-6045 | TSE-7395-AX-S |
|---|---|---|---|---|
| Intermediate Prepolymer | Drais 9.2 | Drais 9.2 | Drais 6.2 | Lodige 7.2 |
| Cap Visc Temp (° C.) | 230 | 230 | 230 | 230 |
| Shear Rate (1/s) | | Capillary Shear Viscosity (Pa-s) | | |
| 27.5 | 137.7 | 270.6 | 471.1 | 1510 |
| 50 | 122.1 | 164.6 | 384.9 | 1072 |
| 91.3 | 99.0 | 120.8 | 323.8 | 774.8 |
| 166 | 89.6 | 97.2 | 267.6 | 558.6 |
| 302 | 83.8 | 87.3 | 218.3 | 407.2 |
| 550 | 75.1 | 75.7 | 174.6 | 295.4 |
| 1002 | 66.7 | 66.8 | 137.3 | 208.3 |
| 1824 | 56.6 | 57.2 | 106.8 | 150.3 |
| 3321 | 46.5 | 46.8 | 81.3 | 108.4 |
| 5497 | 37.9 | 37.7 | 61.7 | 80.7 |

Figure 3:
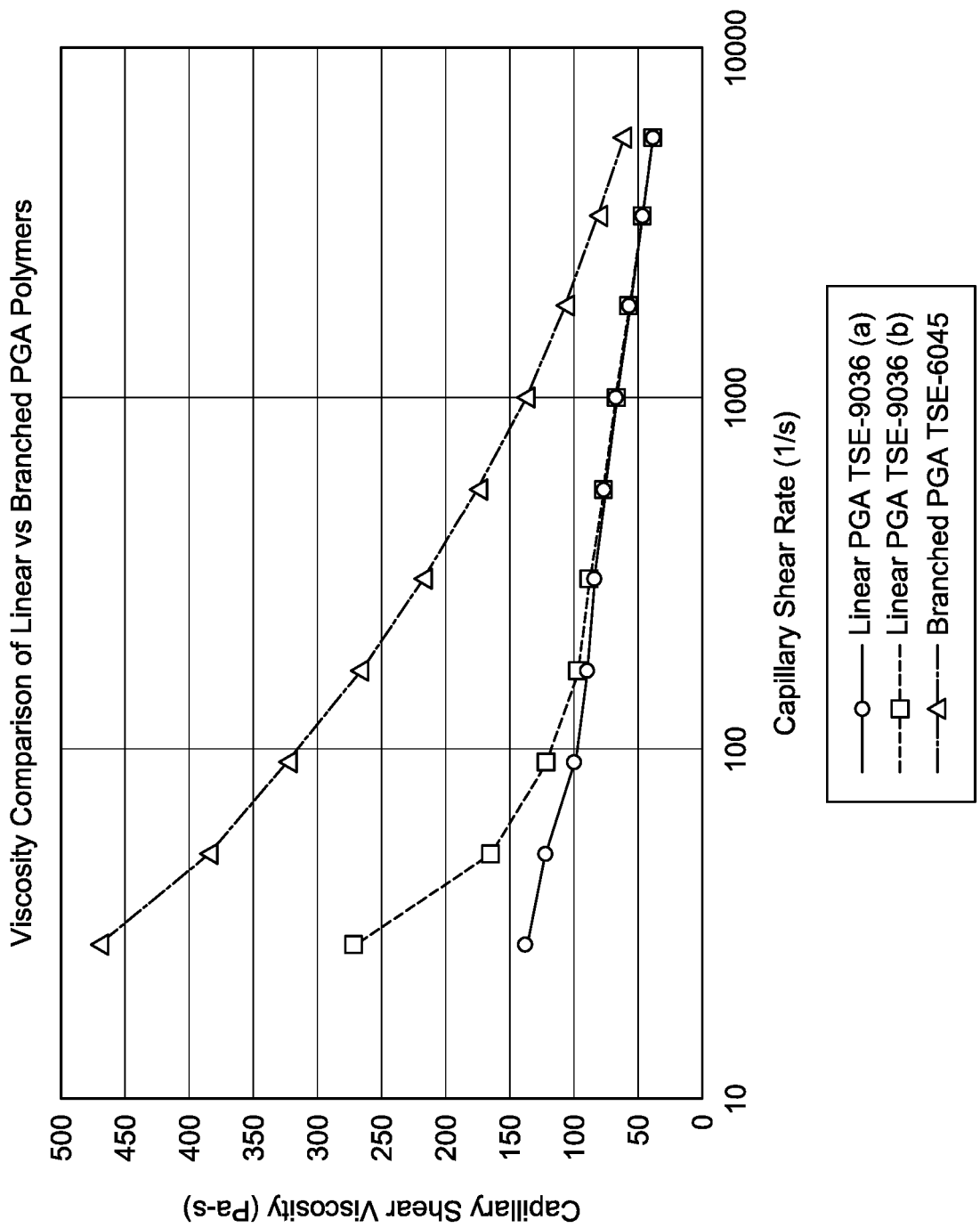
FIG. 3 shows comparative examples of the capillary melt viscosity for linear and branched PGA polymers.

Table 5 and FIG. 3 demonstrate an embodiment by comparing the substantially lower melt viscosity after reactive extrusion which was achieved with TSE-9036, a linear poly(hydroxy acid) final polymer, as compared with TSE-6045, a branched poly(hydroxy acid) final polymer. Clearly, the presence of the active chain terminator in TSE-9036 lowered available reactive sites, final molecular weight, and the capillary melt viscosity of this linear example versus the harmlessly incorporated chain terminator within the branched structure of the TSE-6045 polymer of the comparative examples.

Figure 4:
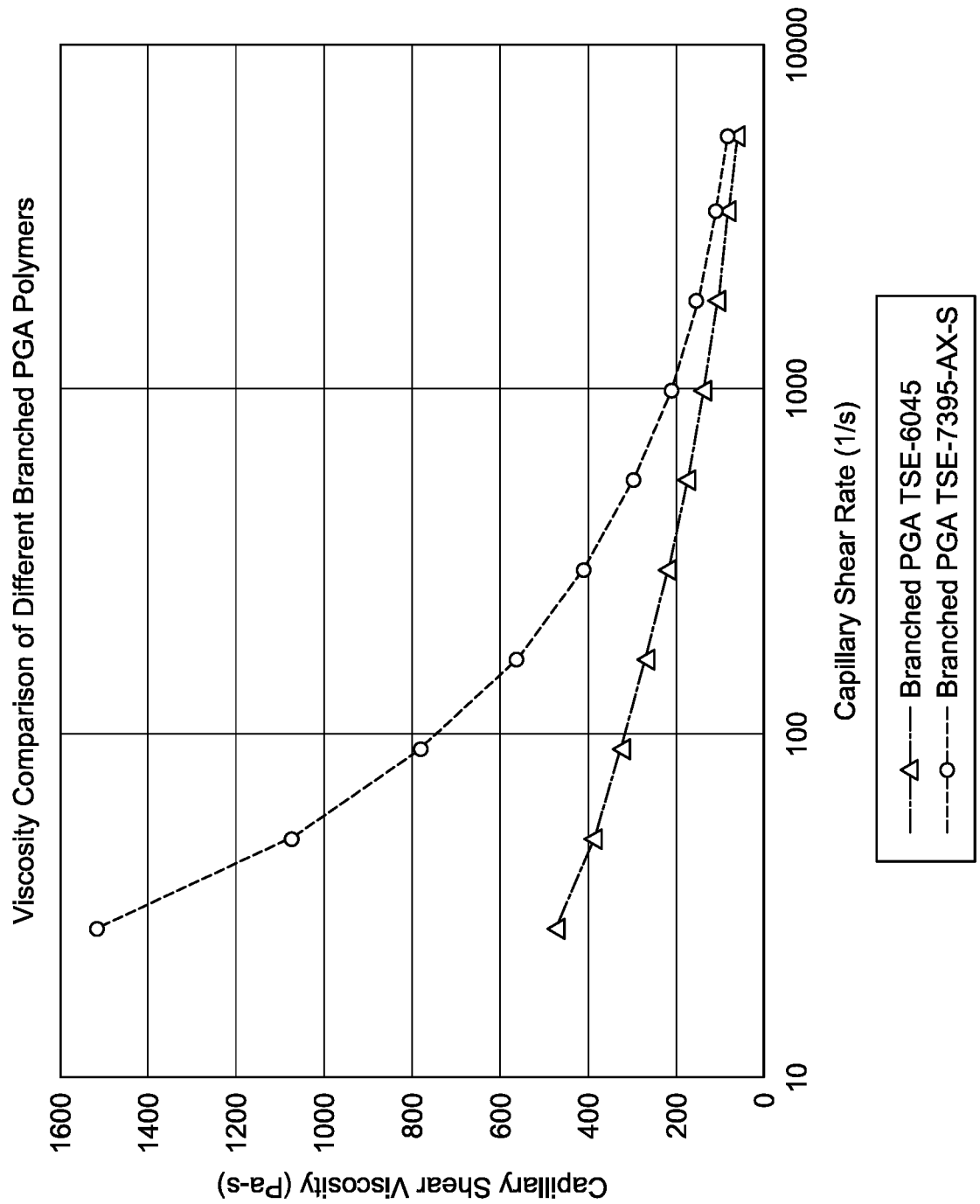
FIG. 4 shows comparative examples of the capillary melt viscosity for branched PGA polymers.

In addition, Table 5 and FIG. 4 demonstrate that within the family of branched polymers, it is observed that the intermediate prepolymer recipe, the polycondensation process conditions, and the reactive extrusion recipe and process may all contribute to a preferred embodiment as demonstrated by higher capillary melt viscosity of the final poly(hydroxy acid) polymer.

As another embodiment of the invention, it was observed that there are preferred levels of linear polycondensation initiator, branched polycondensation initiator, and reactive extrusion chain-extender which result in good downstream processing (e.g. injection molding, stretch-blow molding, film casting, thermoforming, etc.) of the poly(hydroxy acid)

Figure 5:
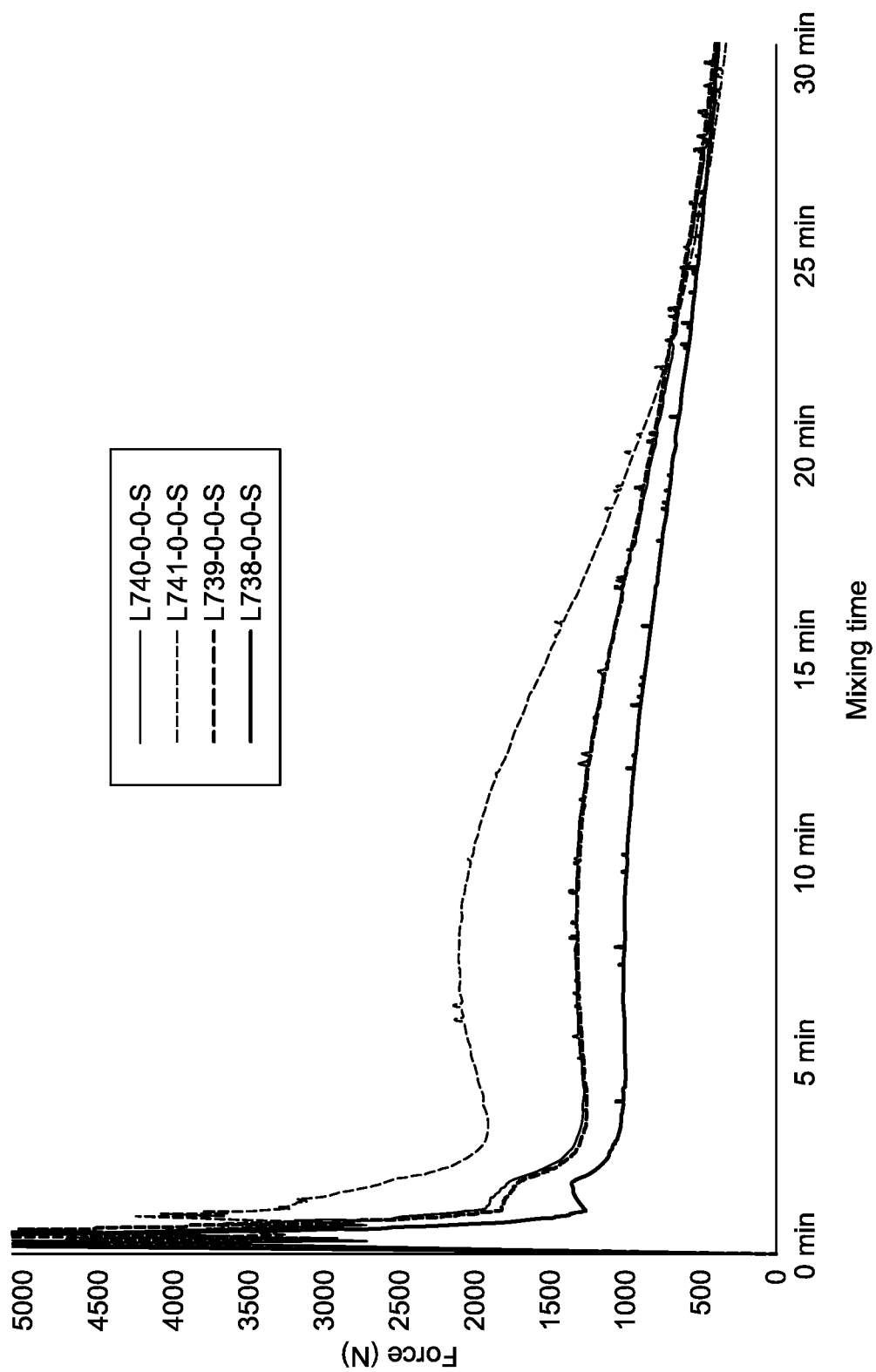
FIG. 5 shows examples of polymer stability from 3-30 minutes showing the impact of BOX chain extender on apparent polymer melt viscosity.

FIG. 5 displays a scan of melt force (surrogate for melt viscosity) versus time for four final polymer recipes made from the same Lodige 7.2 intermediate prepolymer. These four different final polymers were nearly identical except that they were reactively extruded with four different levels of BOX chain extender. PGA samples L738-0-0-S, L739-0-0-S, L740-0-0-S, and L741-0-0-S were extruded with 3.8 wt. %, 3.9 wt. %, 4.0 wt. %, and 4.1 wt. % BOX, respectively. As FIG. 5 demonstrates, final polymer melt viscosity behavior/stability between approximately 2-10 minutes is impacted significantly by the increasing BOX level used to produce the different polymers. Since a time-stable (flat) melt viscosity (force) curve is desired for downstream processing, it is clear that too much or too little chain-extender can negatively impact behavior of the final poly (hydroxy acid) polymer. Too much chain extender is understood to de-stabilize final polymer melt viscosity over time while too little chain extender is understood to decrease final polymer melt viscosity below the threshold for satisfactory downstream melt processing performance.

Figure 6:
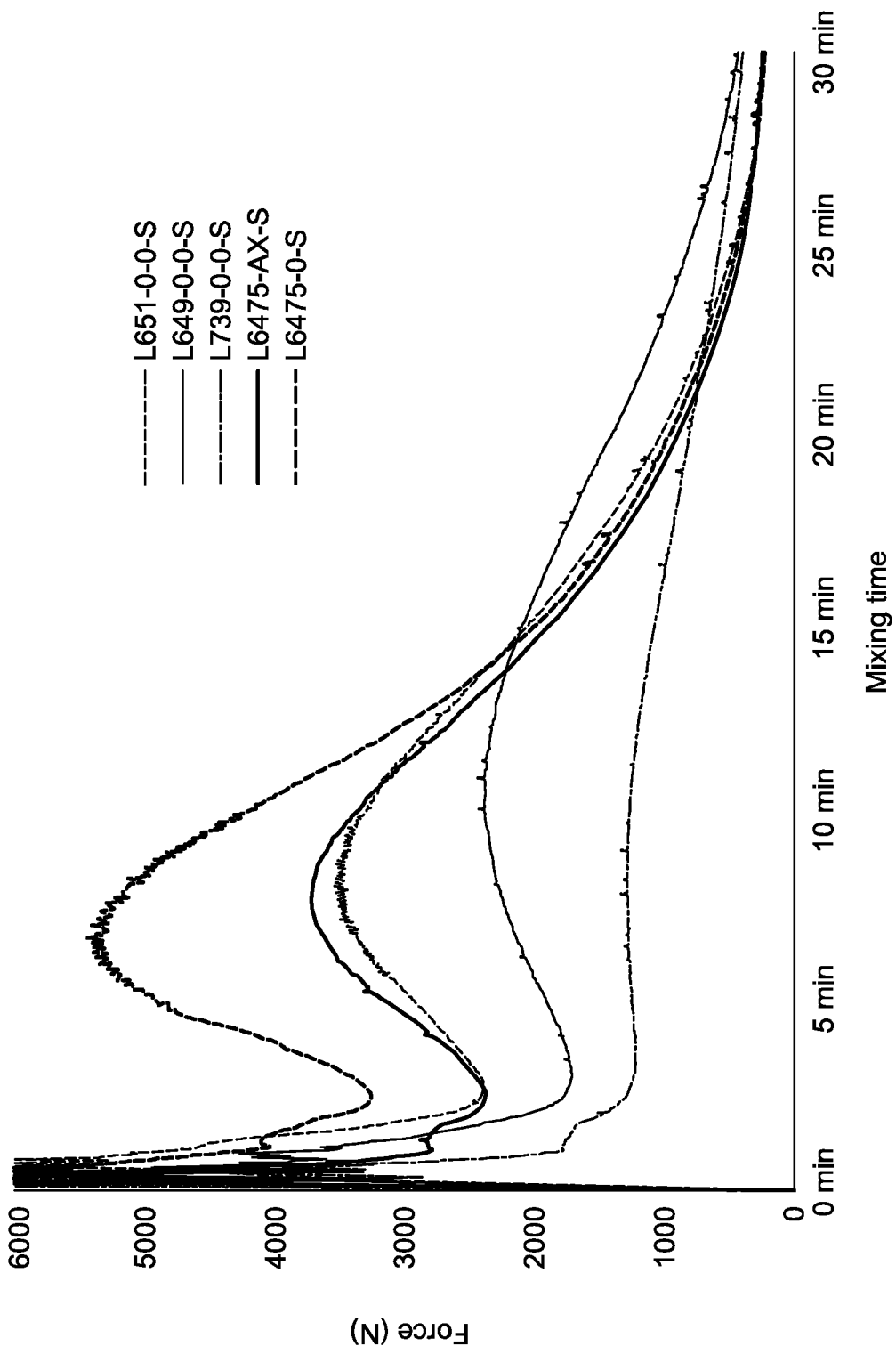
FIG. 6 shows examples of polymer stability from 3-30 minutes showing the effect of branched initiator and chain extender on apparent melt viscosity.

FIG. 6 demonstrates that the level of branched polycondensation initiator in the intermediate prepolymer can influence the long-term melt viscosity behavior of the final poly(hydroxy acid) polymer even more dramatically than the level of chain extender used for reactive extrusion. The upper four, highly unstable melt viscosity (force) curves were generated using poly(hydroxy acid) polymers produced from Lodige 6.2 intermediate prepolymer. By comparison, the lowest, stable melt viscosity (force) curve was generated using final poly(hydroxy acid) polymer produced from Lodige 7.2 intermediate prepolymer. In addition to the higher BOX levels (from 4.75% to 5.1%) of the four upper curves as compared with the lowest curve (3.9%), Lodige 6.2 intermediate prepolymer was produced with 25% more branched initiator as compared with Lodige 7.2 (0.625 versus 0.50 wt. %).

The additional, excessive branched polycondensation initiator appears responsible for the dramatic melt viscosity (force) instability observed between approximately 2-10 minutes. Furthermore, the optimum levels of branched polycondensation initiator and chain extender necessarily depend upon the specific levels of chain terminator and linear polycondensation initiator, since only excessive amounts of branched initiator and chain extender would have the highly deleterious effect seen in FIG. 6.

Obviously, numerous modifications and variations of the present invention are possible in light of the above teachings. It is therefore to be understood that within the scope of the appended claims, the invention may be practiced otherwise than as specifically described herein.

The invention claimed is:

1. A thermoplastic polymer, comprising reacted units of:
   (i) a hydroxy acid compound selected from the group consisting of glycolic acid, lactic acid, and mixtures thereof, and
   (ii) 0.5-2.5 wt % of a di-functional diol initiator comprising one or more diols, and
   (iii) 0.2 to 1 wt % of a multi-functional polyol initiator selected from the group consisting of pentaerythritol, glycerol, triethanolamine, and mixtures thereof, and
   (iv) from 0.15 to 0.45 wt % of methoxyacetic acid chain-terminator, and
   (v) optionally, a reactive chain-extending coupling-agent comprising a di-isocyanate;
   and one or more components that may optionally be reacted with the thermoplastic polymer:
   (vi) optionally, one or more catalysts selected from the group consisting of antimony trioxide, antimony glycolate, camphorsulfonic acid, cobalt acetate, tin (II) chloride, stannous actuate, zinc acetate, zinc lactate, methanesulfonic acid, and mixtures thereof, and
   (vii) optionally, an additive package selected from the group consisting of a catalyst deactivator, a heavy-metal deactivator, a heat stabilizer, an antioxidant, and mixtures thereof.

2. A container having an opening and a cavity defined by a polymer wall, wherein the polymer wall comprises:
   a polyethylene terephthalate (PET) polymer or copolymer, where the PET has an intrinsic viscosity between about 0.65 and about 1.30 dL/g, and
   the thermoplastic polymer of claim 1,
   wherein the container is selected from the group consisting of an injection molded container, a stretch blow molded container, an extrusion blow molded container, and a thermoformed container.

3. The container of claim 2, where the thermoplastic polymer is confined to one or more discrete or semi-discrete layers which in a multi-layer container structure.

4. The container of claim 2, that meets requirements for recycling as defined by the Association of Plastics Recyclers (APR) Critical Guidance.

5. A polymer film or film-derived package having a polymer composition comprising the thermoplastic polymer of claim 1 and one or more of a second thermoplastic polymer or copolymer, a second copolymer and a different poly(hydroxy acid) polymer or copolymer.

6. The polymer film or film-derived package of claim 5, comprising the poly(hydroxy acid) polymer, wherein the poly(hydroxy acid) polymer is confined to one or more discrete or semi-discrete layers in an overall multi-layer film structure.

7. The polymer film or film-derived package of claim 5, that meets requirements for recycling as defined by the Association of Plastics Recyclers (APR) Critical Guidance.

8. The thermoplastic polymer of claim 1, comprising the reactive chain-extending coupling-agent in an amount from 4.0 to 5.0 wt %.

9. The thermoplastic polymer of claim 1, comprising glycolic acid in an amount of at least 90% by weight based on the total weight of the thermoplastic polymer and the thermoplastic polymer has a weight average molecular weight of greater than 100,000 by GPC.

* * * * *